(12) United States Patent
Bao et al.

(10) Patent No.: US 11,492,852 B2
(45) Date of Patent: Nov. 8, 2022

(54) MECHANICAL LOCKING OF CUTTING ELEMENT WITH CARBIDE MATRIX

(71) Applicant: Smith International, Inc., Houston, TX (US)

(72) Inventors: Yahua Bao, Orem, UT (US); John Daniel Belnap, Lindon, UT (US); Gregory Caron, Lehi, UT (US); Feng Yu, Lindon, UT (US); Cheng Peng, Orem, UT (US); Michael David France, Lehi, UT (US); John Parker, Spanish Fork, UT (US); Anatoliy Garan, Provo, UT (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/061,669

(22) PCT Filed: Dec. 14, 2016

(86) PCT No.: PCT/US2016/066701
§ 371 (c)(1),
(2) Date: Jun. 13, 2018

(87) PCT Pub. No.: WO2017/106373
PCT Pub. Date: Jun. 22, 2017

(65) Prior Publication Data
US 2018/0363384 A1  Dec. 20, 2018

Related U.S. Application Data

(60) Provisional application No. 62/267,262, filed on Dec. 14, 2015.

(51) Int. Cl.
*E21B 10/55* (2006.01)
*E21B 10/42* (2006.01)
(Continued)

(52) U.S. Cl.
CPC .............. *E21B 10/55* (2013.01); *E21B 10/42* (2013.01); *E21B 10/485* (2013.01); *E21B 10/54* (2013.01);
(Continued)

(58) Field of Classification Search
None
See application file for complete search history.

(56) References Cited

U.S. PATENT DOCUMENTS

RE25,684 E    11/1964  Coulter
4,440,246 A    4/1984  Jurgens
(Continued)

FOREIGN PATENT DOCUMENTS

CN    101153363 A    4/2008
CN    204225772      4/2008
(Continued)

OTHER PUBLICATIONS

International Preliminary Report on Patentability issued in related International Patent application PCT/US2016/066701, dated Jun. 28, 2018, 14 pages.
(Continued)

*Primary Examiner* — Matthew Troutman
*Assistant Examiner* — Douglas S Wood

(57) ABSTRACT

A cutting device for use in a drill bit has a body including an ultrahard material. The body has a top surface, a front surface, and at least one lateral surface adjacent the top surface. The lateral surface is oriented at a surface angle relative to the top surface between 30 and 150 degrees. One or more locking features are located on the lateral surface.

20 Claims, 11 Drawing Sheets

(51) Int. Cl.
*E21B 10/54* (2006.01)
*E21B 10/58* (2006.01)
*E21B 10/573* (2006.01)
*E21B 10/567* (2006.01)
*E21B 10/48* (2006.01)
*B23P 15/28* (2006.01)

(52) U.S. Cl.
CPC ........ *E21B 10/5676* (2013.01); *E21B 10/573* (2013.01); *E21B 10/58* (2013.01); *B23P 15/28* (2013.01)

(56) References Cited

U.S. PATENT DOCUMENTS

| | | | |
|---|---|---|---|
| 4,453,605 | A | 6/1984 | Short, Jr. |
| 4,624,830 | A | 11/1986 | Barr |
| 4,646,857 | A * | 3/1987 | Thompson .......... E21B 10/5735 175/430 |
| 4,667,756 | A | 5/1987 | King et al. |
| 4,858,706 | A | 8/1989 | Lebourgh |
| 5,007,493 | A | 4/1991 | Coolidge et al. |
| 5,025,873 | A | 6/1991 | Cerkovnik |
| 5,248,006 | A | 9/1993 | Scott et al. |
| 5,282,513 | A | 2/1994 | Jones |
| 5,348,108 | A | 9/1994 | Scott et al. |
| 5,447,208 | A | 9/1995 | Lund et al. |
| 5,487,436 | A | 1/1996 | Griffin |
| 5,819,862 | A | 10/1998 | Matthias et al. |
| 5,944,129 | A | 8/1999 | Jensen |
| 6,248,447 | B1 | 6/2001 | Griffin et al. |
| 6,269,894 | B1 | 8/2001 | Griffin |
| 6,290,008 | B1 | 9/2001 | Portwood et al. |
| 7,426,969 | B2 | 9/2008 | Azar |
| 7,971,663 | B1 | 7/2011 | Vail |
| 8,083,012 | B2 | 12/2011 | Voronin et al. |
| 8,157,029 | B2 | 4/2012 | Zhang et al. |
| 8,177,001 | B2 | 5/2012 | McClain et al. |
| 8,191,654 | B2 | 6/2012 | McClain et al. |
| 8,261,858 | B1 * | 9/2012 | Atkins ................ E21B 10/5735 175/420.2 |
| 8,336,648 | B1 | 12/2012 | Weaver et al. |
| 8,349,040 | B2 | 1/2013 | Bellin |
| 8,567,534 | B2 | 10/2013 | Zhang et al. |
| 8,579,053 | B2 | 11/2013 | Bellin et al. |
| 8,943,663 | B2 | 2/2015 | Overstreet et al. |
| 9,068,408 | B2 | 6/2015 | Vempati et al. |
| 9,097,075 | B2 | 8/2015 | Lin |
| 10,024,112 | B2 | 7/2018 | Nilen et al. |
| 10,060,192 | B1 * | 8/2018 | Miess .................. E21B 10/567 |
| 10,071,355 | B2 | 9/2018 | Olofsson et al. |
| 10,316,592 | B2 | 6/2019 | Chen |
| 10,450,808 | B1 * | 10/2019 | Miess ................ E21B 10/5673 |
| 10,745,973 | B2 * | 8/2020 | Grosz .................... E21B 10/42 |
| 2002/0077054 | A1 | 6/2002 | Sung |
| 2002/0084112 | A1 | 7/2002 | Hall et al. |
| 2003/0037640 | A1 | 2/2003 | Griffin et al. |
| 2005/0133276 | A1 | 6/2005 | Azar |
| 2005/0230150 | A1 | 10/2005 | Oldham et al. |
| 2007/0023206 | A1 | 2/2007 | Keshavan et al. |
| 2007/0089913 | A1 | 4/2007 | Desai et al. |
| 2007/0199739 | A1 | 8/2007 | Schwefe et al. |
| 2008/0142276 | A1 * | 6/2008 | Griffo ................ E21B 10/5735 175/434 |
| 2008/0230279 | A1 | 9/2008 | Bitler et al. |
| 2008/0236900 | A1 | 10/2008 | Cooley et al. |
| 2008/0296070 | A1 | 12/2008 | Shen et al. |
| 2009/0178855 | A1 * | 7/2009 | Zhang ................ E21B 10/5676 175/428 |
| 2009/0183925 | A1 * | 7/2009 | Zhang ................ E21B 10/5735 175/428 |
| 2010/0012389 | A1 | 1/2010 | Zhang et al. |
| 2010/0025113 | A1 | 2/2010 | Warren et al. |
| 2010/0025114 | A1 | 2/2010 | Brady |
| 2010/0206941 | A1 | 8/2010 | Egan et al. |
| 2010/0288563 | A1 | 11/2010 | Smith |
| 2010/0314176 | A1 | 12/2010 | Zhang et al. |
| 2010/0320005 | A1 | 12/2010 | Burhan et al. |
| 2011/0061942 | A1 * | 3/2011 | DiGiovanni .......... E21B 10/567 175/428 |
| 2011/0073379 | A1 * | 3/2011 | DiGiovanni .......... E21B 10/573 175/428 |
| 2011/0083909 | A1 | 4/2011 | Shen et al. |
| 2011/0174549 | A1 | 7/2011 | Dolan et al. |
| 2012/0024604 | A1 | 2/2012 | Hoffmaster et al. |
| 2012/0080239 | A1 | 4/2012 | Lyons et al. |
| 2013/0056284 | A1 * | 3/2013 | Atkins ................ E21B 10/5735 175/428 |
| 2013/0112485 | A1 | 5/2013 | Richert et al. |
| 2014/0087640 | A1 | 3/2014 | Morozov et al. |
| 2014/0238753 | A1 | 8/2014 | Nelms et al. |
| 2015/0000988 | A1 * | 1/2015 | Chen .................. E21B 10/5673 51/297 |
| 2015/0165591 | A1 | 6/2015 | Can et al. |
| 2016/0047170 | A1 * | 2/2016 | Matthias ................ E21B 10/567 175/428 |
| 2016/0271757 | A1 * | 9/2016 | Kanyanta ........... B24D 18/0009 |
| 2018/0363382 | A1 * | 12/2018 | Eldredge ............. E21B 10/5676 |

FOREIGN PATENT DOCUMENTS

| | | |
|---|---|---|
| EP | 291314 A2 | 11/1988 |
| EP | 0437855 A2 | 7/1991 |
| WO | WO2005061745 A2 | 7/2005 |
| WO | 2007148060 A1 | 12/2007 |
| WO | WO2011089125 A2 | 7/2011 |
| WO | WO2011144670 A1 | 11/2011 |
| WO | WO2012025516 A2 | 3/2012 |
| WO | WO2012170970 A2 | 12/2012 |
| WO | WO2017106374 A1 | 6/2017 |
| WO | WO2017106388 A1 | 6/2017 |

OTHER PUBLICATIONS

International Preliminary Report on Patentability issued in related International Patent application PCT/US2016/066704, dated Jun. 28, 2018, 12 pages.

International Preliminary Report on Patentability issued in related International Patent application PCT/US2016/066730, dated Jun. 28, 2018, 7 pages.

International Search Report and Written Opinion issued in International Patent application PCT/US2016/066701 dated Apr. 4, 2017. 16 pages.

International Search Report and Written Opinion issued in International Patent application PCT/US2016/066704 dated Mar. 27, 2017. 15 pages.

International Search Report and Written Opinion issued in International Patent application PCT/US2016/066730 dated Apr. 6, 2017. 10 pages.

Plemons et al., New cutter technology for faster drilling in hard/abrasive formations. SPE 132143-MS. COS/SPE International Oil and Gas Conference and Exhibition in China, Jun. 8-10, 2010, Beijing, China. Society of Petroleum Engineers. 10 pages.

Westraadt et al., Thermally stable polycrystalline diamond sintered with calcium carbonate. Diamond and Related Materials vol. 16, Issue 11, Nov. 2007, pp. 1929-1935.

Boland et al., Microstructural characterisation and wear behaviour of diamond composite materials. CSIRO Exploration and Mining, PO Box 883, Kenmore QLD 4069, Australia Materials 2010, 3(2), 1390-1419. Published Feb. 24, 2010. 30 pages.

Radtke et al., Thermally stable polycrystalline diamond cutters for drill bits SPE-90845 SPE Annual Technical Conference and Exhibition, Sep. 26-29, 2004, Houston, Texas. 6 pages.

Sneedon et al., Polycrystalline diamond: manufacture, wear mechanisms, and implications for bit design. Journal of Petroleum Technology vol. 40, No. 12 pp. 1593-1601 Dec. 1988. 9 pages.

Bellin et al., The current state of PDC bit technology Part 3 of 3: Improvements in material properties and testing methods are being

(56) References Cited

OTHER PUBLICATIONS pursued to make PDC the cutter of choice for an increasing variety of applications. World Oil, Nov. 2010 issue, pp. 67-71.
Office Action issued in U.S. Appl. No. 16/061,694 dated Mar. 29, 2019, 10 pages.
Office Action issued in U.S. Appl. No. 16/061,680 dated Mar. 29, 2019, 11 pages.
First Office Action and Search Report issued in Chinese Patent Application No. 201680074980 7 dated Jul. 18, 2019, 16 pages.
First Office Action and Search Report issued in Chinese patent application 201680073227.6 dated August 2, 2019, 8 pages.
First Office Action and Search Report issued in Chinese patent application 201680073209.8 dated Aug. 5, 2019, 11 pages.
Office Action issued in U.S. Appl. No. 16/061,694 dated Sep. 4, 2019, 8 pages.
Office Action issued in U.S. Appl. No. 16/061,680 dated Nov. 12, 2019, 14 pages.
Office Action issued in U.S. Appl. No. 16/061,694 dated Dec. 9, 2019, 8 pages.
Office Action issued in U.S. Appl. No. 16/061,680 dated Mar. 11, 2020, 17 pages.
Office Action received in U.S. Appl. No. 16/061,694 dated May 11, 2020, 7 pages.
Second Office Action and Search Report issued in Chinese Patent Application No. 201680074980.7 dated Jul. 3, 2020, 17 pages.
Second Office Action and Search Report issued in Chinese Patent Application No. 201680073209.8 dated Apr. 13, 2020, 19 pages.
Second Office Action and Search Report issued in Chinese Patent Application No. 201680073227.6 dated Apr. 2, 2020, 12 pages.
Decision of Rejection received in Chinese Patent Application No. 201680073227.6 dated Sep. 2, 2002, 8 pages with English translation.
Third Office Action and Search Report issued in Chinese Patent Application No. 201680073209.8 dated Nov. 6, 2020, 23 pages with English Translation.
Third Office Action and Search Report issued in Chinese Patent Application No. 201680074980.7 dated Dec. 22, 2020, 14 pages with English Translation.
Fourth Office Action issued in Chinese Patent Application No. 201680073209.8 dated Jun. 2, 2021, 22 pages with English translation.
Fourth Office Action issued in Chinese Patent Application No. 201680074980.7 dated Jul. 8, 2021, 18 pages with English translation.
Decision of Rejection in Chinese Patent Application No. 201680073209.8, dated Nov. 3, 2021, 16 pages.

* cited by examiner

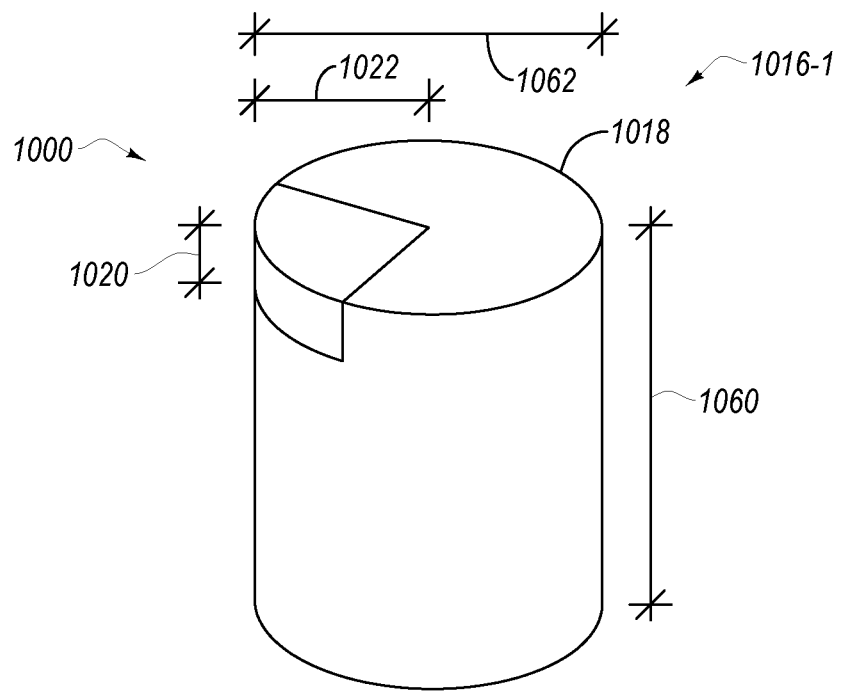
FIG. 17-1
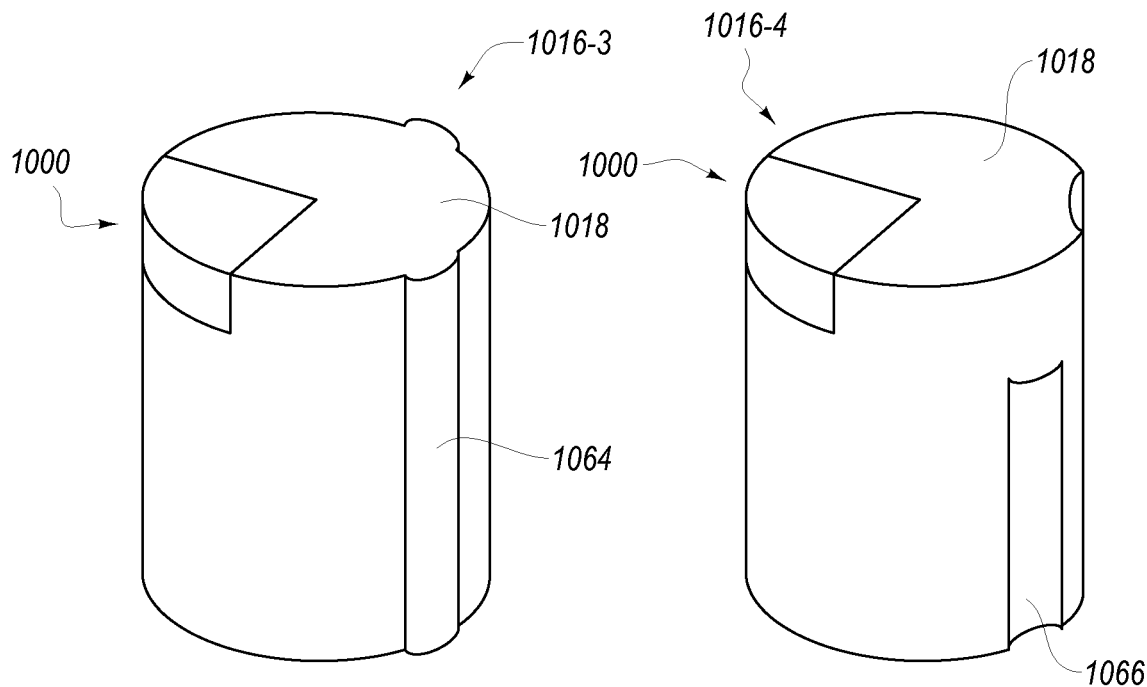
FIG. 17-2  FIG. 17-3

MECHANICAL LOCKING OF CUTTING ELEMENT WITH CARBIDE MATRIX

CROSS-REFERENCE TO RELATED APPLICATIONS

The present application claims priority to and the benefit of U.S. Provisional Patent Application No. 62/267,262 filed Dec. 14, 2015 and titled "MECHANICAL LOCKING OF CUTTING ELEMENT WITH CARBIDE MATRIX", the disclosure of which is incorporated herein by reference in its entirety.

BACKGROUND OF THE DISCLOSURE

Wellbores may be drilled into a surface location or seabed for a variety of exploratory or extraction purposes. For example, a wellbore may be drilled to access fluids, such as liquid and gaseous hydrocarbons, stored in subterranean formations and to extract the fluids from the formations. Wellbores used to produce or extract fluids may be lined with casing around the walls of the wellbore. A variety of drilling methods may be utilized depending partly on the characteristics of the formation through which the wellbore is drilled. In addition, there are other applications which require drilling of subterranean formations including boring for geothermal, water well, construction, utility, communications, or mining applications—including blast hole drilling and roof bolting.

The drilling system may drill a wellbore or other borehole through a variety of formations. The formation may include geologic formations ranging from unconsolidated material to rock formations such as granite, basalt, or metamorphic formations. The drilling system may include a drill bit with a plurality of cutting elements located on the bit to loosen and/or remove material from the formation to create the wellbore. An ultrahard material is conventionally used to provide a cutting edge or surface on the cutting element that is sufficiently durable to penetrate through the formation and maintain desirable uptime of the drilling system.

The ultrahard material is not brazable itself, and several materials are used to affix a layer of the ultrahard material to a drill bit. For example, in a conventional fixed cutter bit, the ultrahard material is manufactured in a single cutting element, which is then affixed to a wettable matrix to allow the ultrahard material to be indirectly brazed to a drill bit. The ultrahard material is affixed to the matrix by an intermediate material that infiltrates both the matrix and the ultrahard material. The cutting elements are replaced in the drill bit after a portion of the ultrahard material is worn.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In an embodiment, a cutting device includes a body having a length, a width, and a height. The body includes an ultrahard material and has a top surface, a front surface, and a first lateral surface. The front surface is adjacent the top surface. At least a portion of the first lateral surface is oriented at a surface angle in a range of 30 to 150 degrees relative to the top surface; and one or more locking features located on the lateral surface.

In another embodiment, a cutting assembly includes a cutting device and a matrix. The cutting device includes a body having a length, a width, and a height. The body includes an ultrahard material and has a top surface, a front surface, and a first lateral surface. The front surface is adjacent the top surface. At least a portion of the first lateral surface is oriented at a surface angle in a range of 30 to 150 degrees relative to the top surface; and one or more locking features located on the lateral surface. The matrix includes a matrix material and at least partially surrounds the cutting device. At least part of the matrix engages at least one of the one or more locking features, and the matrix applies a transverse force to at least one of the one or more locking features.

In yet another embodiment, a method of manufacturing a cutting assembly includes providing a blank of ultrahard material and dividing the blank of ultrahard material into at least a first cutting device. The method includes forming one or more locking features in a lateral surface of the first cutting device and positioning a first matrix precursor in contact with at least one of the one or more locking features of the first cutting device. The method further includes curing the first matrix precursor in contact with at least one of the one or more locking features of the first cutting device to produce a first cutting assembly.

In some examples, the method further includes dividing the blank of ultrahard material into a second cutting device. One or more locking features is formed in a lateral surface of the second cutting device and a second matrix precursor is positioned in contact with at least one of the one or more locking features of the second cutting device. The second matrix precursor is cured in contact with the at least one of the one or more locking features of the second cutting device to produce a second cutting assembly.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

One or more specific embodiments of the present disclosure will be described below. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

This disclosure generally relates to devices, systems, and methods for producing cutting devices and assemblies for drilling in earthen and/or other material. In some embodiments, the cutting device may have a body of ultrahard material. The cutting device may be mechanically connected to a matrix to form a cutting assembly. The mechanical connection may be formed by at least a portion of the matrix extending into one or more recesses in a lateral surface of the cutting device. The curing of the matrix from a precursor (e.g., a powder, metal alloy, epoxy, gel, other fluid, or combinations thereof) to a solid body may occur at an elevated temperature (e.g., between 600° and 1200°) and the matrix may have a greater coefficient of thermal expansion than the ultrahard material. The thermal compression of the matrix during cooling from the curing process may apply a compressive force to a sidewall of the recess, thereby compressing the cutting device toward the matrix body.

Figure 1:
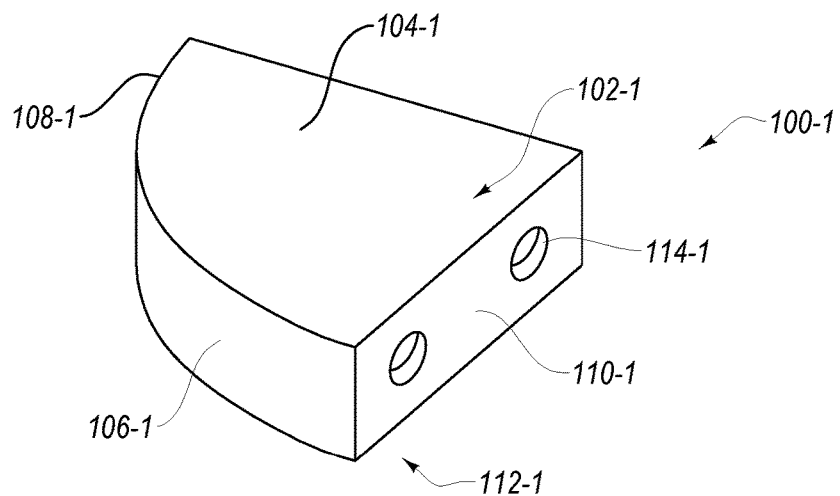
FIG. 1 is a perspective view of an embodiment of a cutting device, according to the present disclosure.

FIG. 1-1 is a perspective view of an embodiment of a cutting device 100-1 according to the present disclosure. The cutting device 100-1 may have a body 102-1 including or made of an ultrahard material. As used herein, the term "ultrahard" is understood to refer to those materials known in the art to have a grain hardness of about 1,500 HV (Vickers hardness in kg/mm$^2$) or greater. Such ultra-hard materials can include those capable of demonstrating physical stability at temperatures above about 750° C., and for certain applications above about 1,000° C., that are formed from consolidated materials. Such ultrahard materials can include but are not limited to diamond, polycrystalline diamond (PCD), leached metal catalyst PCD, non-metal catalyst PCD, hexagonal diamond (Lonsdaleite), cubic boron nitride (cBN), polycrystalline cBN (PcBN), binderless PCD or nanopolycrystalline diamond (NPD), Q-carbon, binderless PcBN, diamond-like carbon, boron suboxide, aluminum manganese boride, metal borides, boron carbon nitride, oxide, nitride, carbide, and boride ceramics, and other materials in the boron-nitrogen-carbon-oxygen system which have shown hardness values above 1,500 HV, as well as combinations of the above materials. In at least one embodiment, the cutting device 100 may be a monolithic PCD. For example, the cutting device 100 may consist of a PCD compact without an attached substrate or metal catalyst phase. In some embodiments, the ultrahard material may have a hardness values above 3,000 HV. In other embodiments, the ultrahard material may have a hardness value above 4,000 HV. In yet other embodiments, the ultrahard material may have a hardness value greater than 80 HRa (Rockwell hardness A).

In some embodiments, the cutting device 100-1 may have a top surface 104-1 and a front surface 106-1 that meet at a cutting edge 108-1. In some embodiments, the top surface 104-1 may be substantially planar. In other embodiments, at least a portion of the top surface 104-1 may be curved (i.e., convex and/or concave relative to the body 102-1). In some embodiments, at least a portion of the front surface 106-1 may be curved relative to the body 102-1. For example, at least a portion of the front surface 106-1 may be convex relative to the body 102-1, such at least a portion of that the cutting edge 108-1 is an arcuate edge. In another example, at least a portion of the front surface 106-1 may be concave relative to the body 102-1. In other embodiments, the front surface 106-1 may be substantially planar, such that the cutting edge 108 is a straight edge-1. In yet other embodiments, the cutting edge 108-1 may include a plurality of edges, parallel edges, such as on a chamfer that provide multiple cutting surfaces as the cutting device 100-1 moves relative to the earthen and/or other material through which the cutting device 100-1 may cut. In at least one embodiment, the front surface 106-1 may have a constant radius of curvature, such that the cutting edge 108-1 is an arcuate edge with a constant radius of curvature.

The cutting device 100-1 may include one or more lateral surfaces 110-1. For example, a lateral surface 110-1 may extend from the top surface 104-1 to a bottom surface 112-1. In another example, a lateral surface may be a portion of a curved surface (e.g. a semiellipsoid surface and/or semicylindrical surface) that is oriented in a lateral direction relative to the top surface 104-1. In some embodiments, such as shown in FIG. 1-1, the cutting device 100-1 may have a plurality of lateral surfaces 110-1 that are each adjacent to the front surface 106-1. The cutting device 100-1 may have a plurality of lateral surfaces 110-1 that are adjacent to one another and form a corner or other angle therebetween. At least a portion of a lateral surface 110-1 may be planar, curved (e.g., concave and/or convex relative to the body 102-1 in a vertical and/or horizontal direction), textured (e.g., serrated, wavy, chamfered, waffled, etc.), or combinations thereof.

Figures 1, 2:
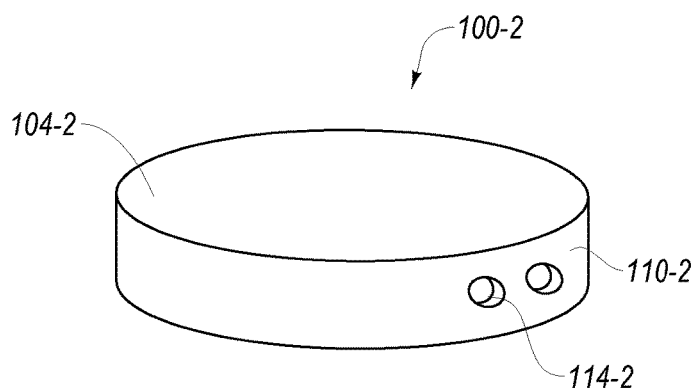
FIG. 2 is side cross-sectional view of an embodiment of a cutting assembly including the cutting device of FIG. 1, according to the present disclosure.
Figures 1, 2, 3:
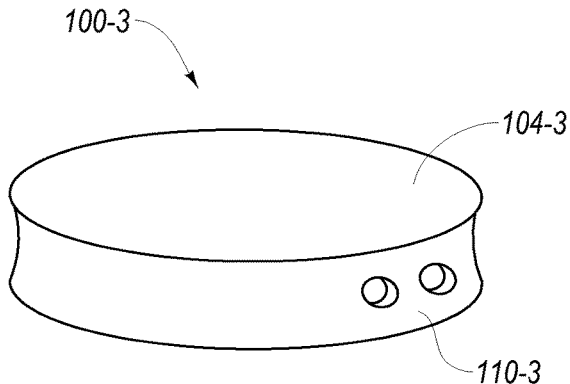
FIG. 3 is a side view of the cutting device of FIG. 1, according to the present disclosure.

In other embodiments, such as depicted in FIG. 1-2, a cutting device 100-2 may have a top surface 104-2 that is elliptical or oblong and one lateral surface 110-2 that is convex relative to the body in a horizontal direction and extends around the body 102-2. One or more locking features 114-2 may be located on the one lateral surface 110-2. In yet other embodiments, such as depicted in FIG. 1-3, a lateral surface 110 may be a continuous lateral surface (i.e., with no corners) having one or more curves and extending from the top surface 104-3 to the bottom surface 112 around the circumference of the top surface 104-2. In some embodiments, a lateral surface may be independently convex and/or concave in a vertical direction and in a horizontal direction. For example, FIG. 1-3 illustrates an embodiment of a cutting device 100-3 having a lateral surface 110-3 convex in a horizontal direction and concave in a vertical direction. In other words, the lateral surface 110-3 may form an hourglass shape in cross-section.

Referring now to FIG. 1-4, in yet other embodiments, a cutting device 100-4 may have a top surface 104-4 with parallel sides (e.g. a trapezoid, a rectangle, a square, a rounded rectangle, an octagon, or other shape with parallel sides). For example, the parallel sides may be one or more lateral surfaces 110-4 that substantially oppose one another.

Referring again to FIG. 1-1, the cutting device 100-1 may include one or more locking features 114-1. In some embodiments, the locking features 114-1 may extend into the body 102-1 of the cutting device 100-1 and form a recess therein. In other embodiments, the locking features 114-1 may extend away from the body 102-1 of the cutting device 100-1 and form a protrusion extending therefrom. It should be understood that geometries and/or dimension described in relation to any of the locking features 114-1 described and/or depicted herein may be applicable to recesses and/or protrusions.

FIG. 2 is a side cross-sectional view of an embodiment of a cutting assembly 116 including any of the cutting devices 100 of FIG. 1-1 through FIG. 1-4. FIG. 2 depicts the cutting device 100 at least partially embedded in a matrix 118 with the top surface 104 of the cutting device exposed. The one or more locking features 114 may mechanically interlock with at least a portion of the matrix 118. In some embodiments, at least one locking feature 114 may be located on the bottom surface 112 of the cutting device 100. The one or more locking features 114 may, thereby, provide an interface between the cutting device 100 and the matrix 118. A mechanical interlock may include an interlock that cannot be separated without plastically deforming and/or fracturing the cutting device 100 and/or the matrix 118. In some embodiments, the matrix may include or be made of a matrix material having a different coefficient of thermal expansion than the ultrahard material of the cutting device 100. For example, the matrix material may be tungsten carbide with a coefficient of thermal expansion of 5.0-11.0 micrometers per meter-Kelvin and the ultrahard material may be a PCD with a coefficient of thermal expansion of 1.3-3.9 micrometers per meter-Kelvin.

In some embodiments, the thermal expansion differential between the cutting device 100 and the matrix 118 may be used to produce a residual stress on the cutting device 100. For example, the matrix material and ultrahard material may be heated during curing of a matrix precursor to form the matrix 118. In some embodiments, the matrix precursor may include or be made of a tungsten carbide powder. In other embodiments, the matrix precursor may include or be made of another carbide powder. In yet other embodiments, the matrix precursor may include or be made of a metal. In further embodiments, the first matrix precursor may include or be made of a matrix material in a suspension or mixed with a fluid substrate.

Upon cooling the matrix 118 and cutting device 100 after curing the matrix precursor to form the matrix 118, the matrix 118 may contract more than the cutting device 100. The mechanical interlock between the one or more locking features 114 of the cutting device 100 and the matrix 118 may translate the differential thermal contraction to the residual stress (e.g., vertical residual stress 119-1 and/or transverse residual stress 119-2) on the cutting device 100, compressing the cutting device 100 toward the matrix 118 and/or directing residual stresses within the ultrahard material of the cutting device 100.

In some embodiments, the matrix 118 may include a brazable material. For example, a brazable material may be any base material that may be infiltrated and/or wetted by a braze alloy without degradation of the base material. For example, matrix 118 may include particles of carbides, oxides, nitrides, or borides such as tungsten carbide, silicon carbide, boron carbide, aluminum oxide, zirconium oxide, silicon nitride, or titanium diboride, which are infiltrated with an alloy that may contain tungsten, cobalt, nickel, manganese, tin, copper, zinc, iron, titanium, vanadium, zirconium, or combinations thereof.

FIG. 3 illustrates a side view of the embodiment of the cutting device 100-1 of FIG. 1-1. The cutting device 100-1 may have a height 120 and a length 122. The height 120 of the cutting device 100-1 may be the distance between the top surface 104-1 and the bottom surface 112-1 of the cutting device 100-1. The lateral surface 110-1 may extend the height 120 of the cutting device 100-1. In some embodiments, the one or more locking features 114-1 may be located substantially centered on the lateral surface 110-1 relative to the height 120 of the cutting device 100-1, as shown in FIG. 3. In other embodiments, the one or more locking features 114-1 may be located on the lateral surface 110-1 with a majority of the locking feature closer to the bottom surface 112-1 of the cutting device 100-1 (e.g., lower on the lateral surface 110-1 relative to the height 120). In yet other embodiments, the one or more locking features 114-1 may be located on the lateral surface 110-1 with a majority of the locking feature closer to the top surface 104-1 of the cutting device 100-1 (e.g., higher on the lateral surface 110-1 relative to the height 120).). Corners on the edges of lateral surfaces 110-1, 110-2, 110-3, 110-4 may employ radiuses to avoid stress concentrations during subsequent matrix casting operations.

Figures 1, 2, 3, 4:
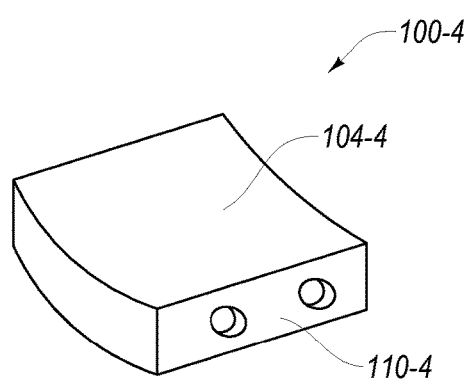
FIG. 4 is a top view of another embodiment of a cutting device, according to the present disclosure.
Figure 2:
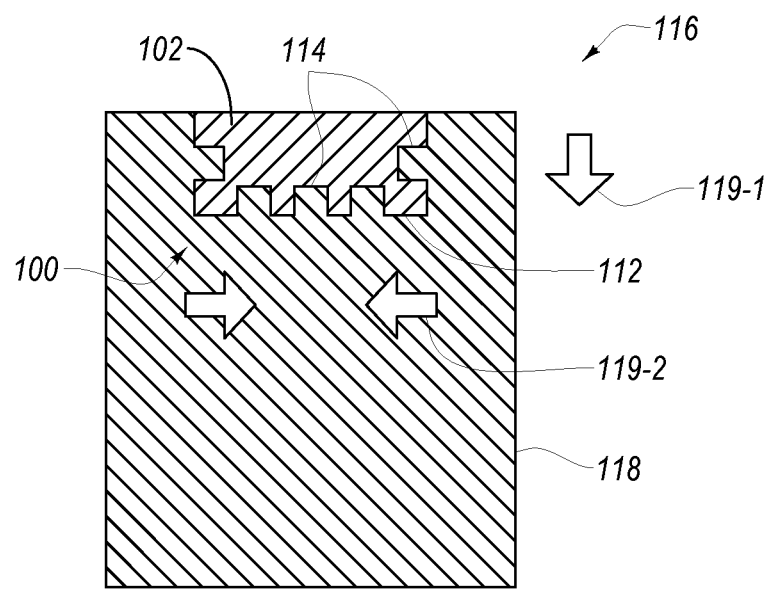
Figure 3:
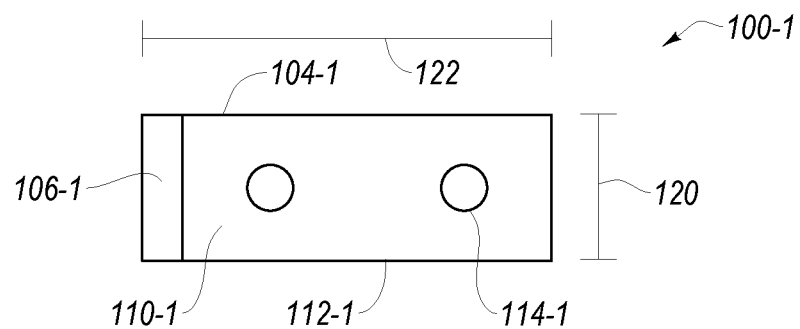
Figure 4:
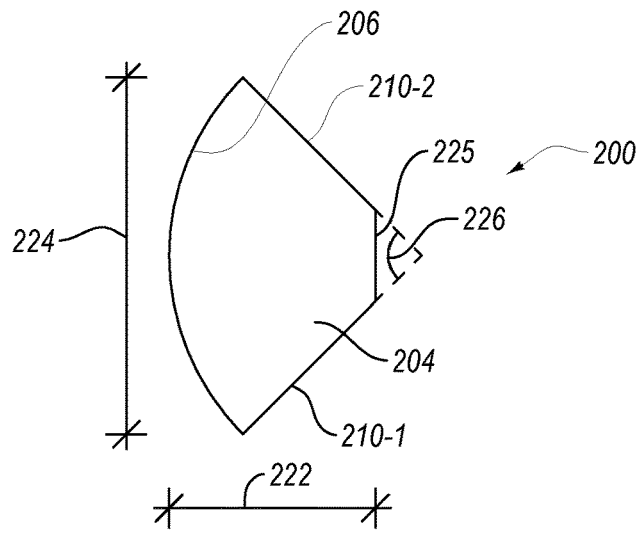

The length 122 of the cutting device 100-1 may be the distance from the center of the front surface 106-1 to a point on the cutting device 100-1 furthest from the center of the front surface 106-1 on an opposing side of the cutting device 100-1. For example, in an embodiment of a cutting device 100-1 such as that depicted in FIG. 1 and FIG. 3, the length 122 may be the distance from the center of the front surface 106-1 to the point at which the lateral surfaces meet opposite the front surface. FIG. 4 illustrates another embodiment of a cutting device 200 in which a length 222 of the cutting device 200 is the distance from the center of the front surface 206 to a rear surface 225 opposing the front surface 206. In some embodiments, the rear surface 225 may extend between a first lateral surface 210-1 and a second lateral surface 210-2. In some embodiments, a cutting device 200 may have one or more locking features located on the rear surface 225.

FIG. 4 depicts a lateral angle 226 formed between at least a portion of the first lateral surface 210-1 and at least a portion of the second lateral surface 210-2 in the plane of the top surface 204. In some embodiments, the lateral angle 226 may be in a range having upper and lower values including any of 30°, 45°, 45°, 50°, 60°, 70°, 80°, 90°, 100°, 110°, 120°, 130°, 140°, 150°, 160°, 165°, or any value therebetween. In some examples, the lateral angle 226 may be in range of 30° to 165°. In other examples, the lateral angle 226 may be in range of 60° to 120°. In some examples, the lateral angle 226 may be in range of 80° to 100°. In at least one example, the lateral angle 226 may be about 90°.

In some embodiments, the cutting device 200 may have a width 224 that extends across the top surface 204 at least partially aligned with the front surface 206. In some embodiments, the width 224 of the cutting device 200 may be greater than the length 222 of the cutting device. In other embodiments, the width 224 of the cutting device 200 may be less than the length 222 of the cutting device. In yet other embodiments, the width 224 of the cutting device 200 may equal to than the length 222 of the cutting device.

In some embodiments, the front surface 206 may have a radius of curvature that is substantially constant across the front surface 206. In other embodiments, the front surface 206 may have a radius of curvature that varies across the front surface 206. For example, the radius of curvature may be greater at or near the center of the front surface 206 than the radius of curvature at or near the first lateral surface 210-1 and/or second lateral surface 210-2. In some embodiments, a radius of curvature of at least a portion of the front surface 206 may be greater than the length 222 of the cutting device 200. In other embodiments, a radius of curvature of at least a portion of the front surface 206 may be less than the length 222 of the cutting device 200. In other embodiments, the surface 206 may be substantially flat. In yet other embodiments, a radius of curvature of at least a portion of the front surface 206 may be equal to the length 222 of the cutting device 200.

Figure 5:
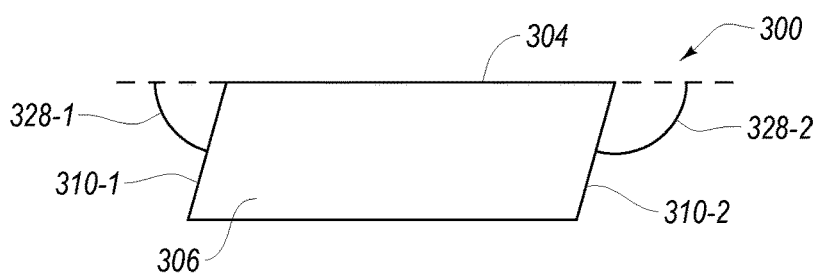
FIG. 5 is an end view of yet another embodiment of a cutting device, according to the present disclosure.

FIG. 5 illustrates an end view of another embodiment of a cutting device 300, according to the present disclosure. The cutting device 300 may have a first lateral surface 310-1 and a second lateral surface 310-2. The first lateral surface 310-1 and second lateral surface 310-2 may be adjacent to the front surface 306. In some embodiments, the first lateral surface 310-1 and/or second lateral surface 310-2 of the cutting device 300 may be substantially perpendicular to a top surface 304 of the cutting device 300. In other embodiments, the first lateral surface 310-1 and second lateral surface 310-2 may form a first surface angle 328-1 and a second surface angle 328-2, respectively, with the top surface 304. In some embodiments, the first surface angle 328-1 and second surface angle 328-2 may be the same. In other embodiments, the first surface angle 328-1 and second surface angle 328-2 may be different, such as depicted in FIG. 5.

In some embodiments, the first surface angle 328-1 and/or second surface angle 328-2 may be in a range having upper and lower values including any of 30°, 40°, 50°, 60°, 70°, 80°, 90°, 100°, 110°, 120°, 130°, 140°, 150°, or any value therebetween. For example, the first surface angle 328-1 and/or second surface angle 328-2 may be in a range of 30° to 150°. In other examples, the first surface angle 328-1 and/or second surface angle 328-2 may be in a range of 60° to 120°. In yet other examples, the first surface angle 328-1 and/or second surface angle 328-2 may be in a range of 80° to 100°.

Figure 6:
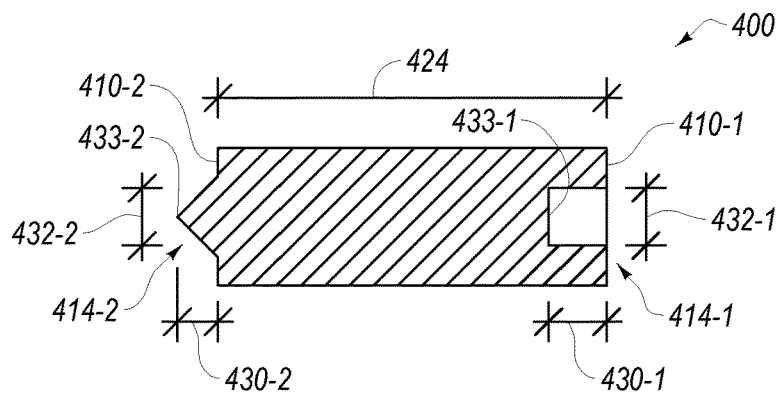
FIG. 6 is an end cross-sectional view of a further embodiment of a cutting device, according to the present disclosure.

FIG. 6 through FIG. 9 depict end cross-sectional views of different embodiments of cutting devices including locking features of various geometries and dimensions. While the embodiments of cutting devices depicted in FIG. 6 through FIG. 9 illustrate locking features recessed into the cutting devices, it should be understood that the geometries and dimensions described herein may be equally applicable to locking features protruding from the cutting devices. For example, FIG. 6 illustrates an embodiment of a cutting device 400 having a first locking feature 414-1 recessed into the first lateral surface 410-1 of the cutting device 400. The first locking feature 414-1 may have a width 430-1 and a height 432-1. The width 430-1 of the depicted recess may be the distance to which the first locking feature 414-1 extends into the body 402 of the cutting device 400, while in an embodiment of a cutting device having a protrusion locking feature, such as the second locking feature 414-2 protruding from the second lateral surface 410-2, the width 430-2 may be the distance to which the protrusion extends away from the body 402 of the cutting insert. Any embodiment of a recess and/or protrusion described herein may be inverted relative to a lateral surface to be a recess and/or protrusion of equivalent geometries and/or dimensions.

FIG. 6 illustrates an embodiment of a cutting device 400 having a first lateral surface 410-1 with a first locking feature 414-1. The cutting device 400 includes a second lateral surface 410-2 with a second locking feature 414-2. In some embodiments, a cutting device 400 may have a plurality of cutting features that are the same. In other embodiments, such as the cutting device 400 shown in FIG. 6, the first locking feature 414-1 and second locking feature 414-2 may be different from one another. For example, the first locking feature 414-1 may be a recess and the second locking feature 414-2 may be a protrusion. In another example, the first locking feature 414-1 may have an end 433-1 that is flat in longitudinal cross-section (e.g., the end 433-1 may be elliptical, rectangular, polygonal, irregular, or combinations thereof) and the second locking feature 414-2 may have an end 433-2 that is tapered, rounded, or otherwise has an apex in longitudinal cross-section (e.g., the end 433-1 may be pointed or semi-spherical).

In some embodiments, the cutting device 400 may have a first locking feature 414-1 that has a width 430-1 that is a percentage of a width 424 of the cutting device 400 in a range having upper and lower values including any of 2%, 5%, 10%, 15%, 20%, 25%, or any value therebetween. For example, the first locking feature 414-1 may have a width 430-1 that is in a range of 2% to 25% of the width 424 of the cutting device 400. In other examples, the first locking feature 414-1 may have a width 430-1 that is in a range of 5% to 20% of the width 424 of the cutting device 400. In yet other examples, the first locking feature 414-1 may have a width 430-1 that is about 10% of the width 424 of the cutting device 400.

Figure 7:
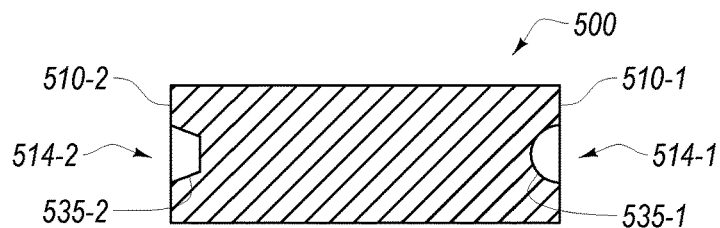
FIG. 7 is an end cross-sectional view of a yet further embodiment of a cutting device, according to the present disclosure.

FIG. 7 is an end cross-sectional view of another embodiment of a cutting device 500 having a first lateral surface 510-1 and a second lateral surface 510-2. A first locking feature 514-1 may be a rounded locking feature with curved sidewalls 535-1 in longitudinal cross-section. For example, the first locking feature 514-1 may be a semi-spherical recess or protrusion. The second locking feature 514-2 may have angled sidewalls 535-2 that are truncated in longitudinal cross-section. For example, the second locking feature 514-2 may be trapezoidal in longitudinal cross-section, such as a frustoconical recess or protrusion.

Figure 8:
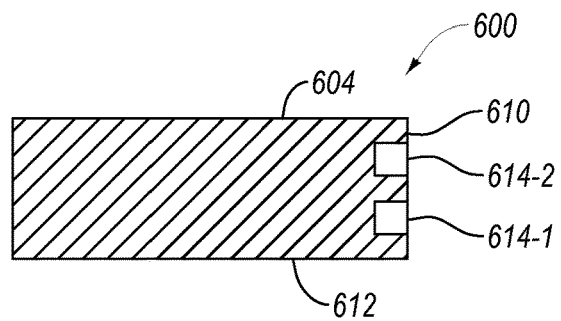
FIG. 8 is an end detail cross-sectional view of another embodiment of a cutting device, according to the present disclosure.

FIG. 8 is an end cross-sectional view of another embodiment of a cutting device 600 having multiple rows of locking features. In some embodiments, a cutting device 600 may have a first locking feature 614-1 and a second locking feature 614-2 on the same lateral surface 610. In some embodiments, the first locking feature 614-1 and second locking feature 614-2 may be vertically offset from one another. For example, the first locking feature 614-1 may be a lower locking feature and the second locking feature 614-2 may be an upper locking feature. The lower locking feature may be closer to a bottom surface 612 of the cutting device 600 than the upper locking feature, which may be closer to a top surface 604 of the cutting device 600 than the lower locking feature. In some embodiments, the lower and upper locking features (i.e., the first locking feature 614-1 and second locking feature 614-2) may be vertically aligned with one another on the lateral surface 610 such that at least a portion of the first locking feature 614-1 and at least a portion of the second locking feature 614-2 are visible in the same end cross-section, such as shown in FIG. 8.

Figure 9:
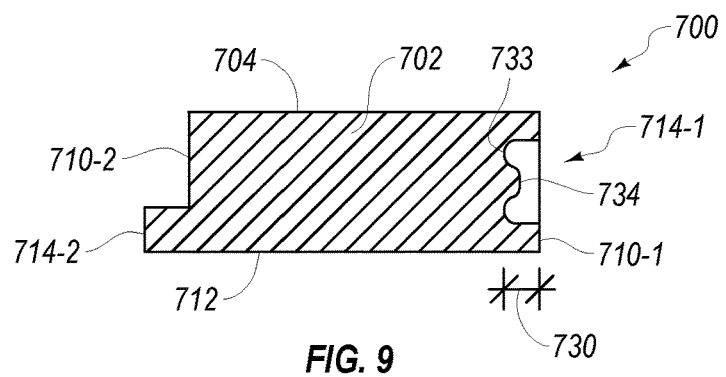
FIG. 9 is an end detail cross-sectional view of yet another embodiment of a cutting device, according to the present disclosure.

FIG. 9 illustrates yet another embodiment of a locking feature. A cutting device 700 may include a first locking feature 714-1 that has a ridge 734 in an end 733 of the first locking feature 714-1. In some embodiments, the ridge 734 may be a portion of the end 733 that has a lesser width 730 than surrounding portions of the end 733. For example, the end 733 may have a two or more portions that have a greater width 730 than the ridge 734 relative to the first lateral surface 710-1. A second locking feature 710-2 may be adjacent a bottom surface 712 of the cutting device 700, and the second locking feature 710-2 may extend from the cutting device 700 to form a shoulder extending from the body 702 of the cutting device 700. In another embodiment, a locking feature may be a recess that is recessed into the body 702 adjacent a top surface 704 of the cutting device 700, thereby creating a shoulder extending from the body 702 of the cutting device 700.

Figure 10:
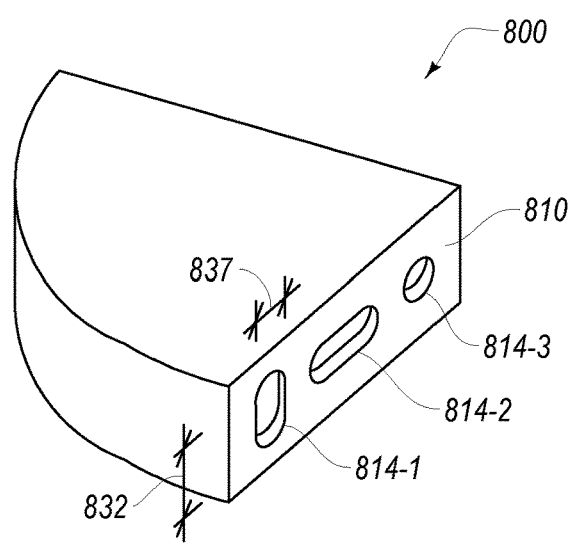
FIG. 10 is a perspective view of an embodiment of a cutting device having different locking features therein, according to the present disclosure.

FIG. 10 is a perspective view of yet another embodiment of a cutting device 800 having at least one lateral surface 810 with one or more locking features therein. The cutting device 800 may have a first locking feature 814-1, a second locking feature 814-2, and a third locking feature 814-3. In some embodiments, one or more of the locking features 814-1, 814-2, 814-3 may have the same aspect ratio relative to the lateral surface 810. The aspect ratio may be a locking feature height 832 relative to a locking feature length 837. In other embodiments, one or more of the locking features 814-1, 814-2, 814-3 may have different aspect ratios relative to the lateral surface 810. In some embodiments, a locking feature may have an aspect ratio (i.e. height 832 to length 837) that is greater than 1, such as the first locking feature 814-1 illustrated in FIG. 10. In other embodiments, a locking feature may have an aspect ratio about 1 (i.e. the height 832 and length 837 are equal), such as the second locking feature 814-2 illustrated in FIG. 10. In yet other embodiments, a locking feature may have an aspect ratio less than 1, such as the third locking feature 814-3 illustrated in FIG. 10. In some embodiments, a locking feature may extend substantially the entire length of a lateral face.

FIG. 10 illustrates embodiments of locking features that are elliptical (e.g., circular) in transverse cross-section. In other embodiments, locking features may have other shapes in transverse cross-section, such as triangular, rectangular, pentagonal, octagonal, regular polygonal, curved, irregular, or combinations thereof.

As described herein, the geometries and/or dimension described in relation to any embodiments herein may be combined in with any other embodiments herein. For example, an aspect ratio described in relation to FIG. 10 may be combined with a width described in relation to FIG. 6. In other examples, a locking feature having a curved profile in longitudinal cross-section, as described in relation to FIG. 7, may be combined with the multiple rows of locking features described in relation to FIG. 8. In yet other examples, an upper locking feature as described in relation to FIG. 8 may be a protrusion locking feature such as described in relation to FIG. 6, and a lower locking feature as described in relation to FIG. 8 may be a recess locking feature such as described in relation to FIG. 6. In further examples, the ridge 734 of FIG. 9 may be combined with a sidewall geometry described in relation to FIG. 7.

Figure 11:
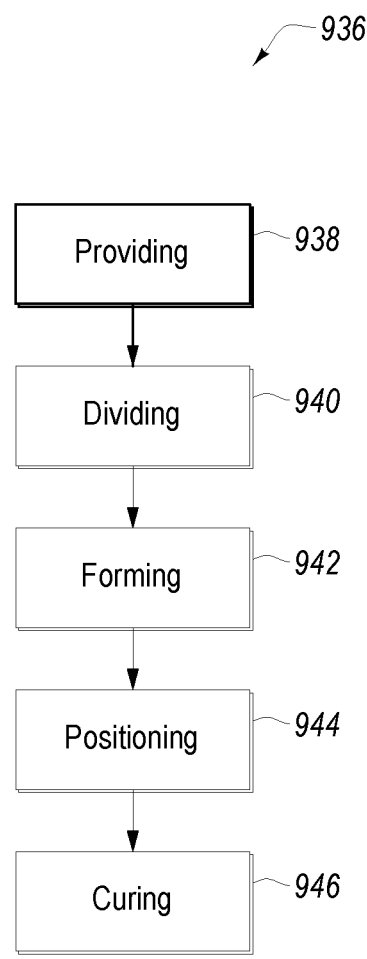
FIG. 11 is a flowchart depicting an embodiment of a method of manufacturing at least one embodiment of a cutting device, according to the present disclosure.

FIG. 11 illustrates an embodiment of a method 936 for manufacturing a cutting assembly according to the present disclosure. The method 936 includes providing 938 a blank of ultrahard material and dividing 940 the blank into one or more pieces including at least a first cutting device, as described herein. The method 936 further includes forming 942 one or more locking features in a lateral surface of the first cutting device and positioning 944 a first matrix precursor in contact with the at least one of the one or more locking features. After positioning 944 the first matrix precursor, the method further includes curing 946 the first matrix precursor to form the matrix of the cutting assembly, as described herein. For example, curing may include sintering, liquid phase infiltration, partial liquid-phase infiltration, catalyzed curing, other processes of densification, or combinations thereof.

Figure 12:
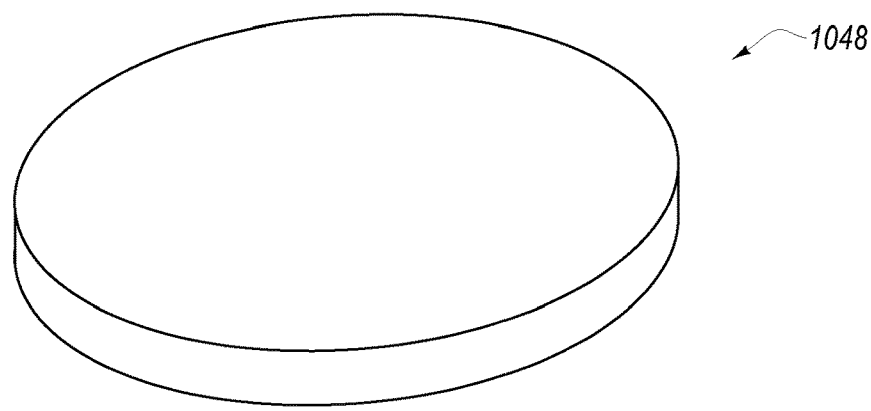
FIG. 12 is a perspective view of an embodiment of a blank of ultrahard material, according to the present disclosure.

FIG. 12 through FIG. 18 illustrate examples and additional embodiments of the method 936. FIG. 12 illustrates an embodiment of a blank 1048 of ultrahard material. For example, the blank 1048 may include or be made of an ultrahard material such as thermally stable polycrystalline diamond (TSP), binder-leached polycrystalline diamond (PCD) (e.g., cobalt-leached), binderless PCD, carbonate PCD (such as calcium carbonate PCD, magnesium carbonate PCD, strontium carbonate PCD, barium carbonate PCD, and other carbonate PCD), PCD-coated tungsten carbide, sintered tungsten carbide, cubic boron nitride, carbon nitride, boron carbon nitride, tungsten carbide doped with titanium carbide, tantalum carbide and/or niobium carbide, silicon carbide, alumina, other ultrahard materials, or combinations thereof. In at least one embodiment, the cutting device 100 may be a monolithic PCD compact.

In some embodiments, the blank 1048 may be a binderless PCD formed in a high-temperature, high-pressure system. For example, the binderless PCD may be sintered in a pressure range of 10 Gigapascal to 25 Gigapascal and in a temperature range of 1500° Celsius to 3000° Celsius. In other embodiments, the blank 1048 may include a PCD that includes a binder. In some embodiments with a metal catalyst based binder, the PCD may be sintered in a pressure range of 5 Gigapascal to 8 Gigapascal and a temperature range of 1300° Celsius to 1600° Celsius. In other embodiments with a carbonate catalyst based PCD, the PCD may be sintered in a pressure range of 6 Gigapascal to 10 Gigapascal and a temperature range of 1500° Celsius to 2400° Celsius. For example, the blank 1048 may include a PCD having a cobalt binder. In another example, the blank 1048 may include a PCD having a magnesium carbonate binder. In some embodiments, the binder may be at least partially leached from the blank 1048. For example, a PCD with a cobalt binder may have at least some of the cobalt acid-leached from the PCD to yield a TSP. In other embodiments, the binder may be at least decomposed at an elevated temperature. For example, a PCD with a magnesium carbonate binder may have at least some of the magnesium carbonate decomposed into carbon monoxide and/or carbon dioxide by heating the blank 1048 to a temperature of more than 500° Celsius.

In some embodiments, at least 50% of the binder material may be removed from the ultrahard material after forming the blank 1048. In other embodiments, at least 80% of the binder material may be removed from the ultrahard material after forming the blank 1048. In yet other embodiments, substantially all of the binder material may be removed from the ultrahard material after forming the blank 1048. In yet further embodiments, less than 5% of the binder material may be removed from the ultrahard material after forming the blank 1048.

FIG. 12 illustrates an embodiment of a blank 1048 that is substantially circular in shape. In other embodiments, a blank 1048 may have other shapes, including elliptical, triangular, rectangular, pentagonal, octagonal, regular polygonal, curved, irregular, or combinations thereof.

Figure 13:
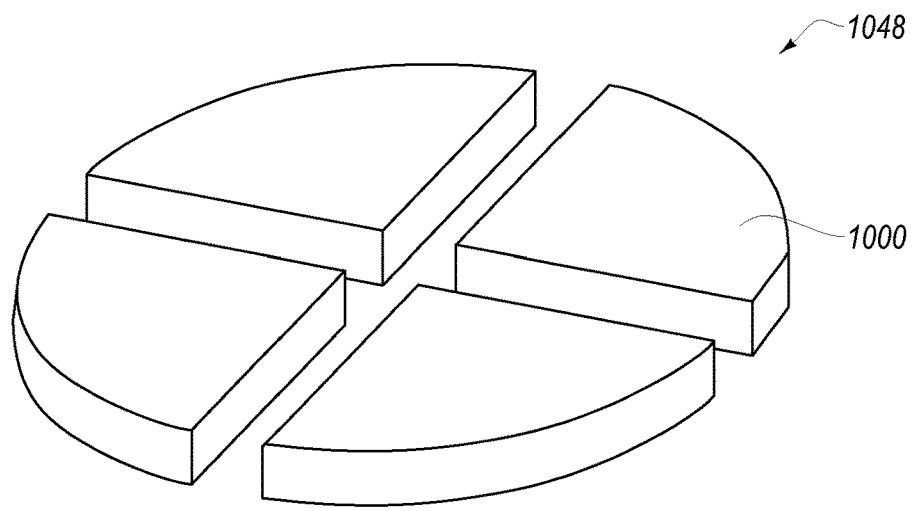
FIG. 13 is a perspective view of an embodiment of a plurality of cutting devices from the blank of FIG. 12, according to the present disclosure.

FIG. 13 depicts the blank 1048 of FIG. 12 divided into a plurality of pieces including at least a first cutting device 1000. The blank 1048 may be divided into a plurality of pieces by a laser, wire electrical discharge machining (EDM), hydrojet, other appropriate cutting methods, or combinations thereof. In some embodiments, the blank 1048 may be cut into equal portions, such as the cutting devices 1000 of equal angular portions of the circular blank 1048 in FIG. 13. In other embodiments, the blank 1048 may be cut into unequal portions, such as dividing a rectangular blank into the cutting devices 1000 of equal angular portions depicted in FIG. 13. In yet other embodiments, the blank 1048 may be divided into a plurality of cutting devices having differing dimensions and/or geometries.

It should be understood that while the blank 1048 may have a binder leached and/or decomposed therefrom prior to dividing the blank 1048, as described herein, in some embodiments, the blank 1048 may be divided prior to leaching and/or decomposing of the binder. In other embodiments, the binder may be at least partially leached and/or decomposed prior to dividing the blank 1048, and another portion of the binder may be at least partially leached and/or decomposed after dividing the blank 1048 into a plurality of pieces. Leaching and/or decomposing after dividing the blank 1048 may increase efficiency of the leaching and/or decomposing of the binder as the ratio of surface area to volume increases upon dividing the blank 1048.

Figure 14:
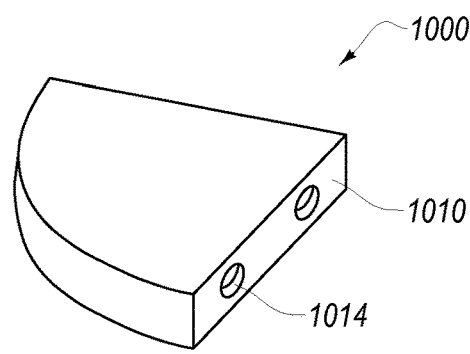
FIG. 14 is a perspective view of an embodiment of a cutting device of FIG. 13 with locking features formed therein, according to the present disclosure.

FIG. 14 is a perspective view of the cutting device 1000 of FIG. 13. Upon dividing the blank 1048 of FIG. 13 into a plurality of pieces, the cutting device 1000 may have one or more lateral surfaces 1010, as described herein. One or more locking features 1014 may be formed in and/or on the lateral surface 1010. In some embodiments, the one of more locking features 1014 may be formed by laser, wire electrical discharge machining (EDM), hydrojet, other appropriate cutting methods, or combinations thereof. While the locking features 1014 depicted in FIG. 14 are recessed locking features, as described herein, the locking features 1014 may be recesses and/or protrusions. In at least one embodiment, a plurality of circular recesses may be ablated into the body with a laser. In other embodiments, a protrusion may be formed on a surface of the cutting device 1000 through removal of material from the cutting device 1000 to leave a protrusion remaining. In yet other embodiments, a protrusion may be formed on a surface of the cutting device 1000 through additive manufacturing. In further embodiments, a locking feature may be created by near net shape sintering and/or machining.

Figure 15:
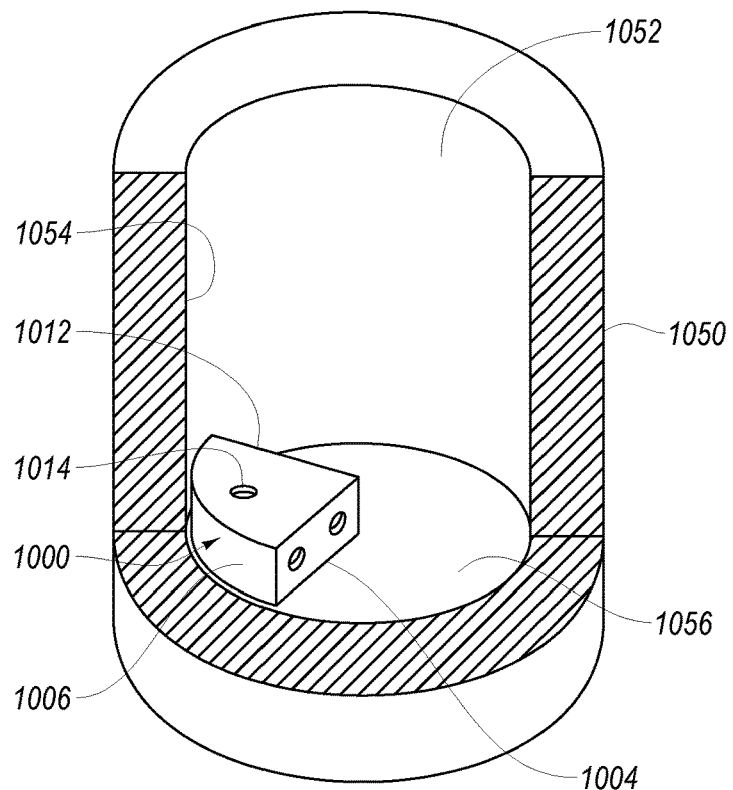
FIG. 15 is a perspective partial cutaway view of an embodiment of a cylinder having the cutting device of FIG. 14 positioned therein, according to the present disclosure.

FIG. 15 is a partial cutaway of an embodiment of a mold 1050 having the cutting device 1000 of FIG. 14 positioned therein. The mold 1050 may have a cavity 1052 with an inner wall 1054 and a base 1056. The mold 1050 may be configured to transmit temperatures and pressures sufficient to cure a matrix precursor. For example, the mold 1050 may be a graphite mold. In other examples, the mold 1050 may include one or more refractory materials, such as alumina, silica, silica carbide, boron nitride, tungsten carbide, hafnium carbide, other refractory materials, or combinations thereof.

The cutting device 1000 may be positioned in the cavity 1052 of the mold 1050 such that a front surface 1006 of the cutting device 1000 is proximate and/or in contact with the inner wall 1054 of the mold 1050 and the top surface 1004 of the cutting device 1000 is proximate and/or in contact with the base 1056 of the mold 1050. As described herein, a bottom surface 1012 of the cutting device 1000 may include a locking feature 1014. A matrix precursor may then be introduced into the cavity 1052 of the mold 1050 and positioned within at least one of the locking features 1014 of the cutting device 1000. In some embodiments the bottom surface 1012 may include one or more surface features such as grooved patterns, curved surfaces, waffled surfaces, scored surfaces, or other surface features known in the industry as non-planar interfaces which function here to limit the in-plane movement of the bottom surface relative to a matrix and apply residual compression to the cutting device. In some embodiments, the cutting device 1000 may be temporarily affixed to the mold 1050 in a desired position and/or orientation.

Figure 16:
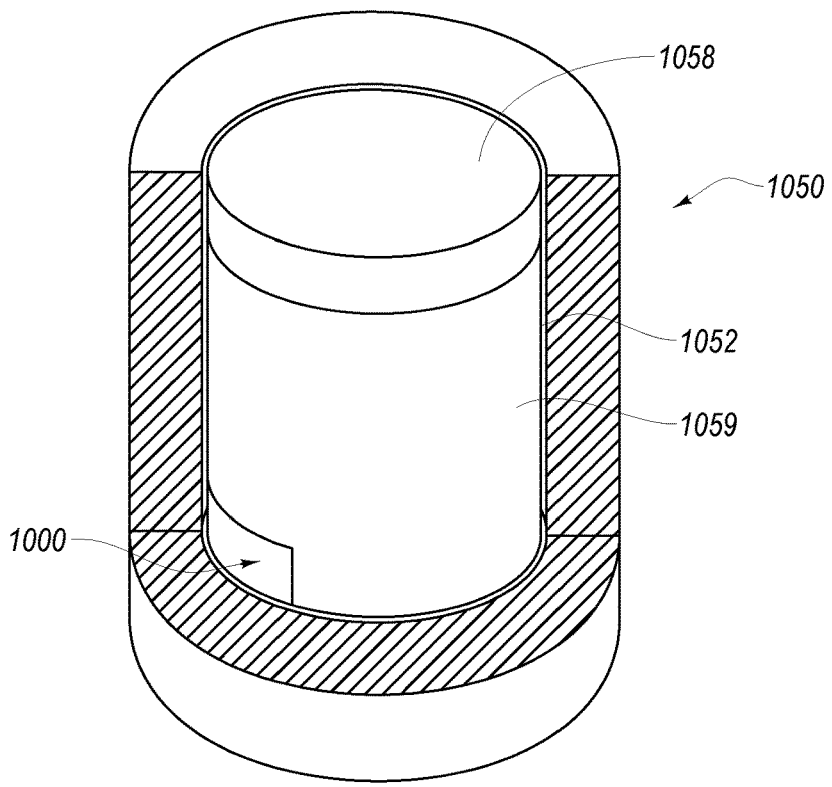
FIG. 16 is a perspective partial cutaway view of the cylinder of FIG. 15 with a carbide matrix precursor therein, according to the present disclosure.
Figures 4, 17:
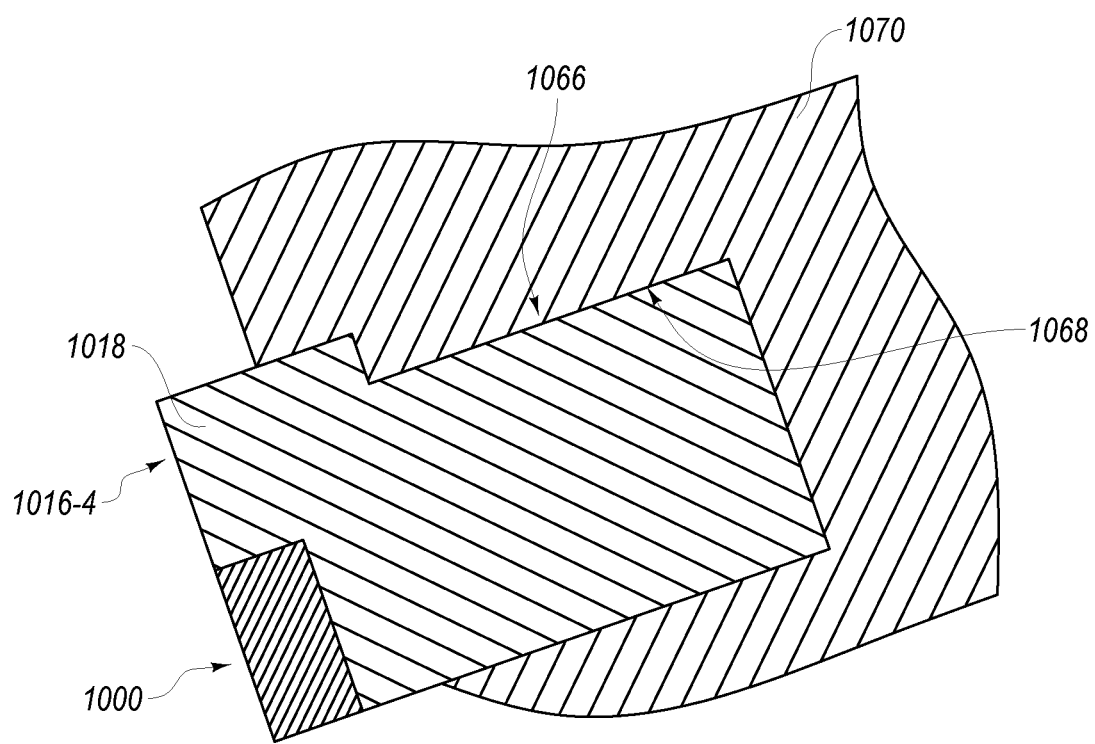
FIG. 17 is a perspective view of an embodiment of a cutting assembly including the carbide matrix precursor of FIG. 16 cured, according to the present disclosure.

FIG. 16 is a partial cutaway of the embodiment of a mold 1050 of FIG. 15 having a cap 1058 thereon. The mold 1050 may transmit heat and pressure to the cutting device 1000 and matrix precursor 1059 in the cavity 1052 to cure the matrix precursor in a matrix 1018, as shown in FIG. 17. In some embodiments, the matrix precursor may cure to form the matrix 1018 at a curing temperature above 800° Celsius. In other embodiments, the matrix precursor may cure to form the matrix 1018 at a curing temperature above 900° Celsius. In yet other embodiments, the matrix precursor may cure to form the matrix 1018 at a curing temperature above 1000° Celsius. In some embodiments, the ultrahard material of the cutting device 1000 may be thermally stable to withstand the curing temperature at least partially due to the previous removal of binder material, as described in relation to FIG. 12.

FIG. 17-1 through FIG. 17-4 illustrates embodiments of a cutting assembly 1016-1, 1016-3, 1016-4 having a cutting device 1000 and a matrix 1018 mechanically interlocked by the engagement of the one or more locking features of the cutting device and the matrix 1018. Upon curing the matrix 1018, the cutting assembly 1016-1 may be at or near the curing temperature of 800° Celsius or more. For example, curing the matrix 1018 may include curing at a pressure less than 1 Gigapascal and in a temperature range of 500° Celsius to 1300° Celsius. In at least one example, curing the matrix 1018 may include curing at atmospheric pressure and at a temperature of about 1050° Celsius. As described herein, the cutting device 1000 and the matrix 1018 may include or be made of different materials with different coefficients of thermal expansion. The cooling of the cutting assembly 1016-1 from the curing temperature to an ambient temperature may produce a residual stress at the one of more locking features that compresses the cutting device 1000 toward the matrix 1018.

In some embodiments, the connection between the ultrahard material of the cutting device 1000 and the matrix material of the matrix 1018 may be a mechanical connection without any infiltration layer or other bonding layer between the cutting device 1000 and the matrix 1018. In other words, the cutting device 1000 and the matrix 1018 may be directly connected to one another by mechanical and/or frictional means. In other embodiments, the mechanical bond may supplement an infiltration layer or other bonding layer between the cutting device 1000 and the matrix 1018. In other words, the mechanical engagement of the matrix 1018 and the cutting device 1000 may be used in addition to known bonding methods.

The cutting assembly 1016-1 may have an assembly height 1060 and an assembly length 1062. In some embodiments, the cutting assembly 1016 may have a circular transverse cross-section, and the assembly length 1062 may be a diameter of the cutting assembly 1016-1. In other embodiments, the cutting assembly 1016 may have other shapes, including elliptical, triangular, rectangular, pentagonal, octagonal, regular polygonal, curved, irregular, or combinations thereof.

The assembly height 1060 may be greater than or equal to a cutting device height 1020. In some embodiments, the cutting device height 1020 may be a percentage of the assembly height 1060 that is in a range having upper and lower values including any of 10%, 20%, 30%, 40%, 50%, 60%, or any value therebetween. For example, the cutting device height 1020 may be in a range of 10% to 60% of the assembly height 1060. In other examples, the cutting device height 1020 may be in a range of 15% to 50% of the assembly height 1060. In yet other examples, the cutting device height 1020 may be in a range of 20% to 40% of the assembly height 1060. In further examples, the cutting device height 1020 may be in a range of 25% to 35% of the assembly height 1060. In at least one example, the cutting device height 1020 may be about 30% of the assembly height 1060.

The assembly length 1062 may be greater than or equal to the cutting device length 1022. In some embodiments, the cutting device length 1022 may be a percentage of the assembly length 1062 that is in a range having upper and lower values including any of 10%, 20%, 30%, 40%, 50%, 60%, 70%, 80%, 90%, 100%, or any value therebetween. For example, the cutting device length 1022 may be in a range of 10% to 100% of the assembly length 1062. In other examples, the cutting device length 1022 may be in a range of 20% to 90% of the assembly length 1062. In yet other examples, the cutting device length 1022 may be in a range of 30% to 80% of the assembly length 1062. In further examples, the cutting device length 1022 may be in a range of 40% to 70% of the assembly length 1062. In at least one example, the cutting device length 1022 may be about 50% of the assembly length 1062. In embodiments in which the assembly length 1062 is an assembly diameter, the cutting device length 1022 may be equal to the assembly radius.

In some embodiments, the cutting assembly 1016-1 may be circular in cross-section (e.g., a cylinder). The cutting device 1000 may have a radius of curvature as described herein. The cutting assembly 1016-1 may have a radius (i.e., one half of the assembly length 1062) that is equal to a radius of curvature of at least a portion of the cutting device 1000. For example, a radius of the cutting assembly 1016-1, may be equal to the radius of curvature of the cutting device 1000 and the cutting device 1000 may form a continuous portion of the perimeter of the cutting assembly 1016-1. In another example, the radius of curvature of the cutting device 1000 may be greater than the radius of the cutting assembly 1016-1. In yet another example, the radius of curvature of the cutting device 1000 may be less than the radius of the cutting assembly 1016-1. In some embodiments, at least a portion of the cutting assembly 1016-1 may be ground to provide a continuous edge between the matrix 1018 and the cutting device 1000 and/or provide a continuous perimeter around the cutting assembly. In other embodiments, at least a portion of the cutting assembly 1016-1 may be ground to reduce the cutting assembly length 1062 and/or height 1060 to control dimensions for use in a drill bit or other applications.

FIG. 17-2 illustrates an embodiment of a cutting assembly 1016-3 including the matrix 1018 with protrusion locking features 1064 extending outwardly therefrom. The protrusion locking features 1064 may engage with recesses in a cavity on a bit body, allowing the cutting assembly 1016-3 to be inserted therein at a particular orientation relative to the body. In some embodiments, one or more of the protrusion locking features 1064 may extend longitudinally along an entire height of the cutting assembly 1016-3. In other embodiments, one or more of the protrusion locking features 1064 may extend longitudinally through only a portion of the height of the cutting assembly 1016-3.

In some embodiments, the cutting assembly 1016-3 may include 1, 2, 3, 4, 5, 6, 7, or more protrusion locking features 1064 extending outwardly from the matrix 1018. For example, the protrusion locking features 1064 may be positioned on the matrix 1018 substantially opposing the cutting device 1000. In other examples, the protrusion locking features 1064 may be spaced extending from the matrix 1018 at predetermined intervals such that the pattern of protrusion locking features 1064 may correspond to particular recesses in cavities in a bit body. The pattern of protrusion locking features 1064 may, thereby, index which cavities into which a cutting assembly 1016-3 may be inserted in a bit body. For example, cavities in a nose region of a bit body may have a first pattern of recesses and cavities in a shoulder region of a bit body may have a second pattern of recesses.

FIG. 17-3 illustrates an embodiment of a cutting assembly 1016-4 including the matrix 1018 with recess locking features 1066 extending outwardly therefrom. The recess locking features 1066 may engage with recesses in a cavity on a bit body, allowing the cutting assembly 1016-4 to be inserted therein at a particular orientation relative to the body. In some embodiments, one or more of the recess locking features 1066 may extend longitudinally along an entire height of the cutting assembly 1016-4. In other embodiments, one or more of the recess locking features 1066 may extend longitudinally through only a portion of the height of the cutting assembly 1016-4.

In some embodiments, the cutting assembly 1016-4 may include 1, 2, 3, 4, 5, 6, 7, or more recess locking features 1066 extending inward toward the matrix 1018. For example, the recess locking features 1066 may be positioned in the matrix 1018 substantially opposing the cutting device 1000. In other examples, the recess locking features 1066 may be spaced extending into the matrix 1018 at predetermined intervals such that the pattern of recess locking features 1066 may correspond to particular protrusion in cavities in a bit body. The pattern of recess locking features 1066 may, thereby, index which cavities into which a cutting assembly 1016-4 may be inserted in a bit body. For example, cavities in a nose region of a bit body may have a first pattern of recesses and cavities in a shoulder region of a bit body may have a second pattern of recesses.

FIG. 17-4 illustrates the embodiment of a cutting assembly 1016-4 with a recess locking feature 1066 slidably engaged with a protrusion 1068 while positioned in a bit body 1070. The matrix 1018 may support the cutting device 1000 at an orientation relative the bit body 1070 at least partially dependent upon the location of the recess locking feature 1066. The cutting assembly 1016-4 is shown with a recess locking feature 1066 extending only partially through the matrix 1018. In some embodiments, a height of the recess locking feature 1066 may at least partially determine the position of the cutting assembly 1016-4 when inserted into the bit body 1070.

Figure 18:
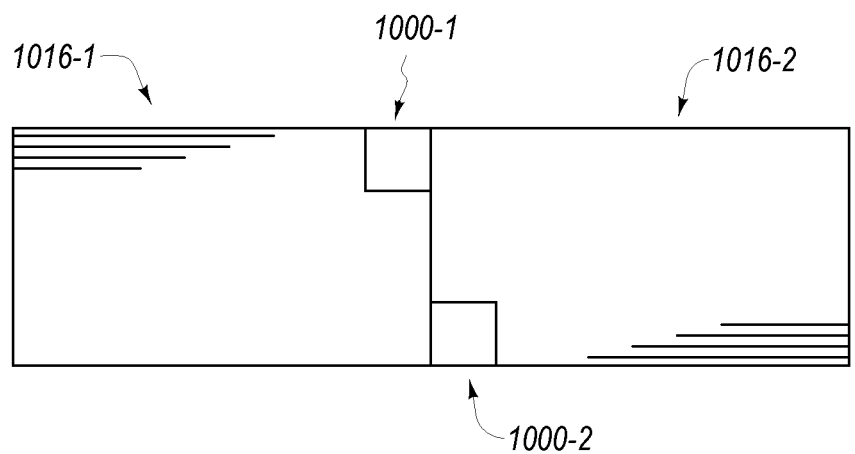
FIG. 18 is a side view of an embodiment of a pair of cutting assemblies prepared for centerless grinding according to the present disclosure.

FIG. 18 illustrates an embodiment of a first cutting assembly 1016-1 and a second cutting assembly 1016-2 prepared for grinding of the first cutting assembly 1016-1 and second cutting assembly 1016-2. In some embodiments, a hardness of a cutting assembly may vary depending upon the orientation of the cutting assembly. A cutting device may include an ultrahard material that has a greater hardness than a matrix material of the matrix, and the ultrahard material may be located asymmetrically within the matrix. For example, a grinding rate (i.e., removal rate of material from a cutting assembly) may vary depending on the orientation of the ultrahard material of the cutting device relative to the matrix material.

In some embodiments, grinding of the first cutting assembly 1016-1 may include positioning the first cutting assembly 1016-1 adjacent to a second cutting assembly 1016-2. The first cutting assembly 1016-1 may have a first cutting device 1000-1 including or made of an ultrahard material, as described herein, and the second cutting assembly 1016-2 may have a second cutting device 1000-2 including or made of an ultrahard material. The first cutting assembly 1016-1 may be oriented with the first cutting device 1000-1 in a first direction and the second cutting assembly 1016-2 may be oriented with the second cutting device 1000-2 in an opposing second direction. The first cutting assembly 1016-1 and second cutting assembly 1016-2 may be rotated during grinding to circumferentially remove material therefrom. The opposing orientations of the first cutting device 1000-1 in a first direction and second cutting device 1000-2 in an opposing second direction may allow the first cutting assembly 1016-1 and second cutting assembly 1016-2 to grind in a more balanced fashion by approximating a rotationally symmetric cutting assembly (e.g., the removal rate at different rotational positions may be more similar than grind a single asymmetric cutting assembly).

In other embodiments, more than two cutting assemblies may be positioned serially adjacent to one another. The more than two cutting assemblies may be rotationally oriented relative to one another (e.g., about a common rotational axis) with cutting devices of the more than two cutting assemblies oriented at equal angular intervals. For example, FIG. 18 illustrates an example of a first cutting assembly 1016-1 and second cutting assembly 1016-2 rotationally oriented such that the first cutting device 1000-1 and second cutting device 1000-2 are oriented at approximately 180° intervals. In other examples, three cutting assemblies may be rotationally oriented such that the cutting devices of the three cutting assemblies are oriented at approximately 120° intervals. In yet other examples, four cutting assemblies may be rotationally oriented such that the cutting devices of the four cutting assemblies are oriented at approximately 90° intervals.

Figure 19:
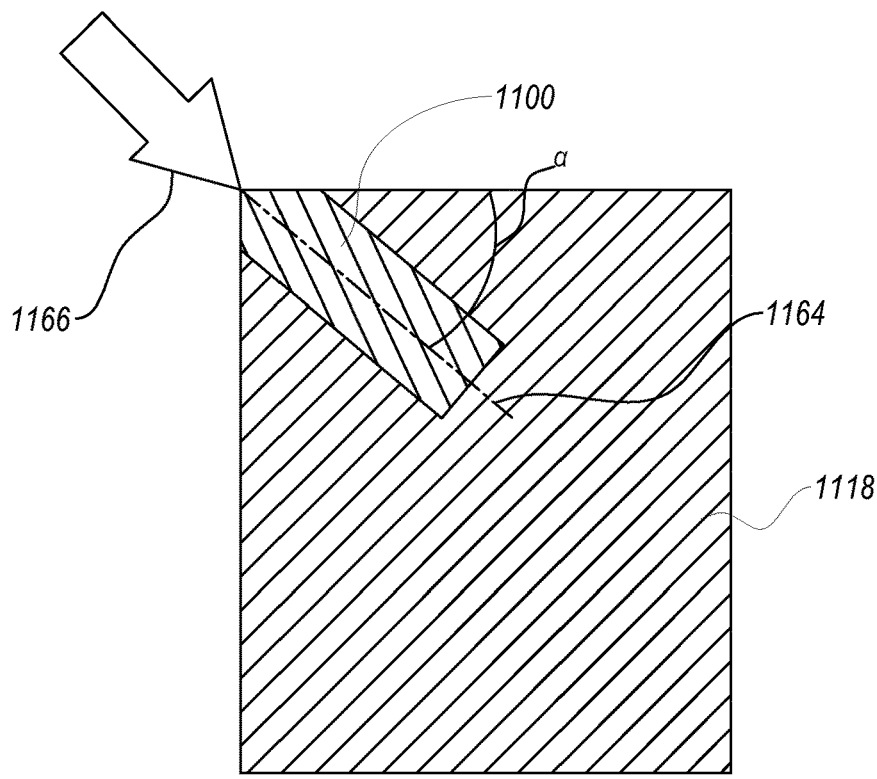
FIG. 19 is a side cross-sectional view of an embodiment of a cutting device cutting device embedded at an angle in a body, according to the present disclosure.

As described herein, a cutting device may be embedded in a matrix using one or more mechanical locking methods and/or mechanisms to improve retention of the cutting device. FIG. 19 illustrates an embodiment of a cutting device 1100 oriented at an angle α within a matrix 1118. In some embodiments, the cutting device 1100 may be oriented at the angle α such that a centerline 1164 of the cutting device 1100 is oriented substantially in line with a contact force 1166 during cutting operations. In other embodiments, the cutting device 1100 may be oriented at the angle α relative to a top surface of the matrix 1118 independently of the contact force 1166. In at least one embodiment, the cutting device 1100 and matrix 1118 may be mechanically interlocked using one or more of the mechanical interlocks described herein to further retain the cutting device 1100 in the matrix 1118. The shape of the cutting device 1100 may be a disc shape, a near-disc shape, a sector or a segment of a disc or near-disc shape, other shape, or combinations thereof.

The angle α may be in a range depending on the expected orientation of the cutting device 1100 when mounted in a bit body. The contact force 1166 may be applied during rotation of the bit body in a wellbore against earthen formations or against casing or cement. In some embodiments, the angle α is in a range having an upper value, a lower value, or upper and lower values including any of 1°, 5°, 10°, 15°, 20°, 25°, 30°, 35°, 40°, 45°, or any values therebetween. For example, the angle α may be greater than 1°. In other examples, the angle α may be less than 45°. In yet other examples, the angle α may be in a range of 1° to 45°. In further examples, the angle α may be in a range of 5° to 40°. In yet further examples, the angle α may be in a range of 10° to 35°. In at least one example, the angle α may be about 20°.

In testing by the inventors, cutting devices were embedded in matrixes at 0°, at 30°, and at 45°. The resulting cutting assemblies were impact tested to failure to compare the failure energy the cutting device of the cutting assembly at the different orientations. The following table illustrates the results of the testing:

| Angle | Failure Energy |
|---|---|
| 0° | 35 J |
| 30° | 50 J |
| 45° | 30 J |

The cutting assembly with a cutting device oriented a 30° angle α had the highest failure energy. In the testing, the cutting assembly with a cutting device oriented a 45° angle α had a failure energy less than that of a cutting assembly with a cutting device oriented a 0° angle α. The test was performed with a disc of thermally stable PCD cast in a carbide matrix ground into a cylinder.

Figure 20:
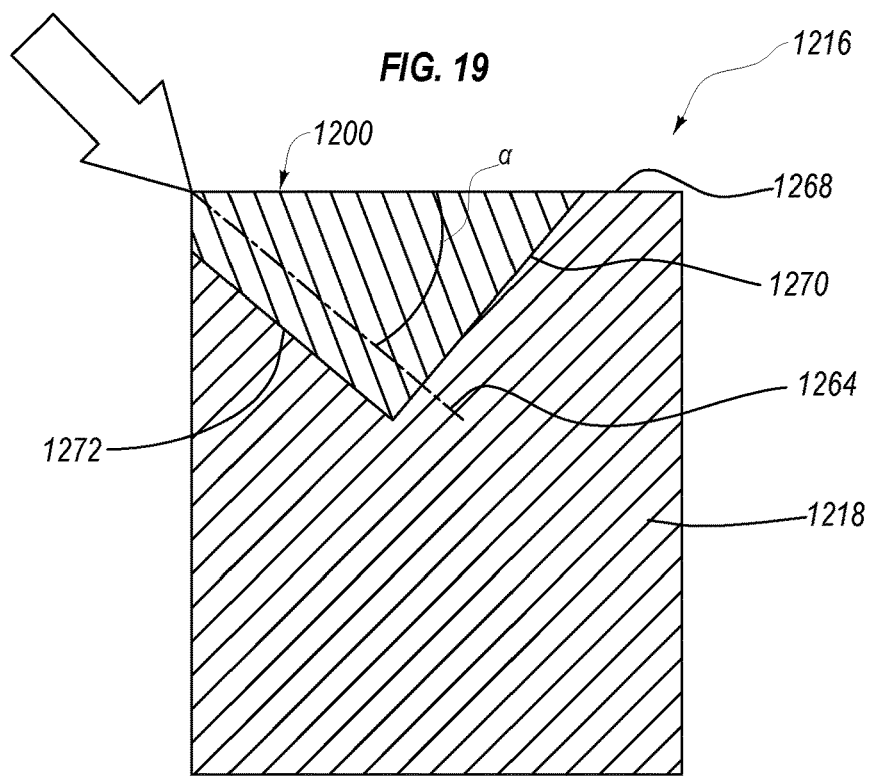
FIG. 20 is a side cross-sectional view of another embodiment of a cutting device embedded at an angle in a body, according to the present disclosure.

FIG. 20 illustrates another embodiment of a cutting device 1200 positioned in a matrix 1218 at an angle α. The cutting device 1200 may be embedded in the matrix 1218 with a top surface 1268 ground down to include both the cutting device 1200 and the matrix 1218. In some embodiments, the centerline 1264 of the cutting device 1200 may be perpendicular to a back surface 1270 of the cutting device 1200 and/or parallel to a bottom surface 1272 of the cutting device 1200. The angle α of the cutting device 1200 is the angle between the centerline 1264 and the top surface 1268 of the cutting assembly 1216.

Figure 21:
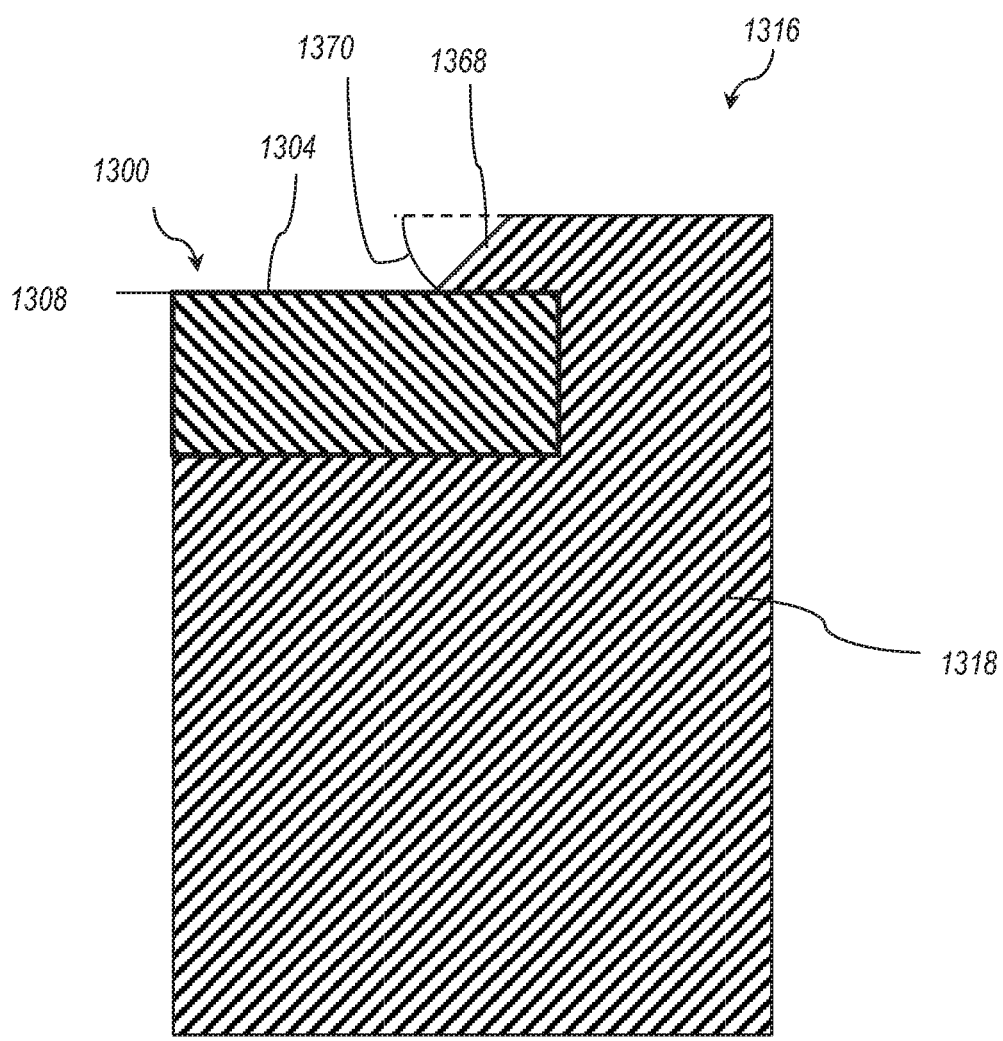
FIG. 21 is a side cross-sectional view of an embodiment of a cutting assembly with matrix contacting opposing sides of a cutting devices, according to the present disclosure.

FIG. 21 is a side cross-sectional view of yet another embodiment of a cutting assembly 1316 with a cutting device 1300 mechanically locked in a matrix 1318. In some embodiments, a cutting device 1300 and/or matrix 1318 according to the present disclosure may develop stress concentrations. A cutting assembly 1316 may, in some embodiments, include a portion of the matrix 1318 that extends over the top surface 1304 of the cutting device 1300. The portion of the matrix 1318 over the top surface 1304 may form a top block 1368 that may provide additional support and/or retention of the cutting device 1300 in the matrix 1318.

In some embodiments, a portion of the top surface 1304 of the cutting device 1300 covered by a top block 1368 may be in a range having an upper value, a lower value, or upper and lower values including any of 0%, 10%, 20%, 30%, 40%, 50%, 60%, 70%, 80%, or any values therebetween. For example, the portion of the top surface 1304 of the cutting device 1300 covered by a top block 1368 may be greater than 0%. In other examples, the portion of the top surface 1304 of the cutting device 1300 covered by a top block 1368 may be less than 80%. In yet other examples, the portion of the top surface 1304 of the cutting device 1300 covered by a top block 1368 may be between 0% and 80%. In further examples, the portion of the top surface 1304 of the cutting device 1300 covered by a top block 1368 may be between 10% and 70%. In still further examples, the portion of the top surface 1304 of the cutting device 1300 covered by a top block 1368 may be between 20% and 60%.

In some embodiments, the top block 1368 may provide additional support and/or retention of the cutting device 1300 in the matrix 1318. In at least one embodiment, the top block 1368 may be integrally formed with the matrix 1318. In other embodiments, the top block 1368 may be affixed to the matrix 1318 by brazing, welding, mechanical fasteners, adhesives, or combinations thereof.

In some embodiments, the top block 1368 may taper in the direction of a cutting edge 1308. The top block 1386 may taper at an angle 1370 relative to the top surface 1304 of the cutting device 1300. In some embodiments, the angle 1370 may be in a range having an upper value, a lower value, or upper and lower values including any of 1°, 5°, 10°, 15°, 20°, 25°, 30°, 35°, 40°, 45°, 50°, 55°, 60°, 65°, 70°, 75°, or any values therebetween. For example, the angle 1370 may be greater than 1°. In other examples, the angle 1370 may be less than 75°. In yet other examples, the angle 1370 may be in a range of 1° to 75°. In further examples, the angle 1370 may be in a range of 5° to 70°. In yet further examples, the angle 1370 may be in a range of 10° to 60°. In at least one example, the angle 1370 may be about 45°.

The embodiments of cutting devices and assemblies have been primarily described with reference to wellbore drilling and/or drill bit operations, the cutting devices and assemblies described herein may be used in applications other than the drilling of a wellbore. In other embodiments, cutting devices and assemblies according to the present disclosure may be used outside a wellbore or other downhole environment used for the exploration or production of natural resources. For instance, cutting devices and assemblies of the present disclosure may be used in a borehole used for placement of utility lines or mining equipment and/or explosives. Accordingly, the terms "wellbore," "borehole" and the like should not be interpreted to limit tools, systems, assemblies, or methods of the present disclosure to any particular industry, field, or environment.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

We claim:

1. A cutting device comprising:
a body including an ultrahard material, the body having a top surface, a front surface, a first lateral surface, and a second lateral surface, the front surface, the first lateral surface, and the second lateral surface extending between the top surface and a bottom surface of the body, wherein a cutting edge is located between the front surface and the top surface, a first lateral edge is located between the top surface and the first lateral surface, a second lateral edge is located between the bottom surface and the first lateral surface, a third lateral edge is located between the top surface and the second lateral surface, and a fourth lateral edge is located between the bottom surface and the second lateral surface;
one or more first locking features located on the first lateral surface, the one or more first locking features being monolithic to the body, the one or more first locking features including a locking feature height that is less than a surface height of the first lateral surface and being spaced apart from all edges around a perimeter of the first lateral surface, wherein at least a portion of the first lateral surface is oriented at a surface angle of 30-80 degrees relative to the top surface, wherein the one or more first locking features cannot be separated from a matrix without plastically deforming or fracturing the matrix; and
one or more second locking features located on the bottom surface, the one or more second locking features being monolithic to the body, the one or more second locking features being offset from all edges around a perimeter of the bottom surface and extending partially through the body in a direction toward the top surface.

2. The cutting device of claim 1, the ultrahard material being a polycrystalline diamond.

3. The cutting device of claim 1, wherein the first lateral surface and the second lateral surface form a lateral angle in a range of between 30 degrees and 165 degrees.

4. The cutting device of claim 3, further comprising one or more third locking features in the second lateral surface, the one or more third locking features in the second lateral surface having a height less than a height of the second lateral surface and spaced apart from all edges around a perimeter of the second lateral surface.

5. The cutting device of claim 1, at least one of the one or more locking features having a width at least 2% of a width of the body and extending only partially between the first and second lateral surfaces.

6. The cutting device of claim 1, the cutting edge being an arcuate edge having a radius of curvature greater than a length of the body.

7. The cutting device of claim 1, wherein at least one of the one or more first locking features is elliptical in transverse cross-section when viewed from a side view of the first lateral surface.

8. The cutting device of claim 1, wherein the one or more first locking features comprises an upper first locking feature and a lower first locking feature, the upper first locking feature being closer to the top surface than the lower first locking feature.

9. The cutting assembly of claim 1, the one or more first locking features including a recess in the first lateral surface, the recess extending into the body and having an end surface with one or more ridges thereon, such that the recess has a variable width.

10. A cutting assembly comprising:
a cutting device, the cutting device including,
a body including an ultrahard material, the body having a length, a width, a height, a top surface, a bottom surface opposite the top surface, a front surface extending between the top surface and the bottom surface, a first lateral surface extending between the top surface and the bottom surface, a cutting edge located between the front surface and top surface, a first lateral edge located between the top surface and the first lateral surface, a second lateral edge located between the bottom surface and the first lateral surface, a third lateral edge located between the top surface and the second lateral surface, and a fourth lateral edge located between the bottom surface and the second lateral surface, and
one or more first locking features located on the first lateral surface and spaced apart from all edges around a perimeter of the first lateral surface,
at least a portion of the first lateral surface being oriented at an angle in a range of 30 to 80 degrees relative to the top surface,
one or more second locking features located on the bottom surface and spaced part from all edges around a perimeter of the bottom surface; and
a matrix including a matrix material at least partially surrounding the cutting device, at least part of the matrix engaging at least one of the one or more locking features such that the matrix and the at least one of the one or more locking features mechanically interlock, the matrix applying a compressive stress directly to at least one of the one or more locking features.

11. The cutting assembly of claim 10, the matrix material being a brazable material.

12. The cutting assembly of claim 10, the matrix contacting the bottom surface of the cutting device and covering at least a portion of the top surface of the cutting device.

13. The cutting assembly of claim 10, the cutting edge being an arcuate edge having a radius of curvature greater than the length of the body.

14. The cutting assembly of claim 10, the cutting device being oriented within the matrix, the cutting device being oriented with a centerline of the cutting device at an angle relative to an end surface of the matrix between 1° and 45°.

15. The cutting assembly of claim 10, wherein the one or more locking features are monolithic to the cutting device.

16. A method of manufacturing a cutting assembly, the method comprising:
 providing a blank of ultrahard material;
 dividing the blank of ultrahard material into at least a first cutting device and a second cutting device, the first cutting device including a top surface, a front surface, a first lateral surface, a second lateral surface, and a bottom surface, the first lateral surface and the second lateral surface extending between the top surface and the bottom surface;
 forming one or more locking features in a lateral surface of the first cutting device by laser ablating some of the ultrahard material from the lateral surface;
 positioning a first matrix precursor in contact with at least one of the one or more locking features of the first cutting device and the bottom surface; and
 curing the first matrix precursor to form a matrix, the first matrix precursor being in contact with at least one of the one or more locking features of the first cutting device to produce a first cutting assembly.

17. The method of claim 16, further comprising at least partially decomposing magnesium carbonate in the ultrahard material before curing the first matrix precursor.

18. The method of claim 16, wherein dividing the blank comprises dividing the blank into at least a first cutting device and a second cutting device.

19. The method of claim 18, further comprising:
 forming one or more locking features in a lateral surface of the second cutting device;
 positioning a second matrix precursor in contact with at least one of the one or more locking features of the second cutting device; and
 curing the second matrix precursor in contact with the at least one of the one or more locking features of the second cutting device to produce a second cutting assembly.

20. The method of claim 19, further comprising:
 positioning the first cutting assembly and second cutting assembly coaxially adjacent to one another with the first cutting device and second cutting devices oriented in opposing directions; and
 removing material from the first cutting assembly and second cutting assembly to such that the first cutting assembly and second cutting assembly are circular in transverse cross-section.

* * * * *